United States Patent
Iizuka et al.

(10) Patent No.: US 9,762,706 B2
(45) Date of Patent: Sep. 12, 2017

(54) PACKET PROCESSING PROGRAM, PACKET PROCESSING APPARATUS, AND PACKET PROCESSING METHOD

(71) Applicant: FUJITSU LIMITED, Kawasaki-shi, Kanagawa (JP)

(72) Inventors: Fumiyuki Iizuka, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 167 days.

(21) Appl. No.: 14/791,985

(22) Filed: Jul. 6, 2015

(65) Prior Publication Data

US 2016/0028859 A1    Jan. 28, 2016

(30) Foreign Application Priority Data

Jul. 22, 2014   (JP) .................................. 2014-148993

(51) Int. Cl.
| | |
|---|---|
| H04L 12/28 | (2006.01) |
| H04L 29/06 | (2006.01) |
| H04L 12/823 | (2013.01) |
| H04L 29/08 | (2006.01) |

(52) U.S. Cl.
CPC ............ *H04L 69/22* (2013.01); *H04L 47/32* (2013.01); *H04L 67/146* (2013.01)

(58) Field of Classification Search
CPC ....................................................... H04J 12/50
USPC ......................................................... 370/401
See application file for complete search history.

(56) References Cited

U.S. PATENT DOCUMENTS

| | | | |
|---|---|---|---|
| 2008/0170531 A1* | 7/2008 | Petry | H04L 65/601 370/312 |
| 2008/0205406 A1 | 8/2008 | Hatakeyama | |
| 2010/0070627 A1 | 3/2010 | Miyazaki et al. | |
| 2011/0280149 A1 | 11/2011 | Okada et al. | |
| 2013/0155918 A1 | 6/2013 | Singh et al. | |

(Continued)

FOREIGN PATENT DOCUMENTS

| | | |
|---|---|---|
| JP | 2007-274332 A | 10/2007 |
| JP | 2008-211682 A | 9/2008 |

(Continued)

OTHER PUBLICATIONS

USPTO,U.S.—OA for related U.S. Appl. No. 15/012,296 dated Jul. 3, 2017, 13 pages.

*Primary Examiner* — Dang Ton
(74) *Attorney, Agent, or Firm* — Fujitsu Patent Center

(57) ABSTRACT

A non-transitory computer-readable storage medium storing therein a packet processing program for causing a computer to execute a process includes specifying, according to acquisition of an IP packet, on the basis of information for specifying a communication session included in a header of the acquired IP packet, a communication session in which the acquired IP packet is transmitted and received, referring to management information corresponding to the specified communication session, and discarding the acquired IP packet when the management information corresponding to an IP packet identifier of the acquired IP packet is present and, when the management information corresponding to the IP packet identifier of the acquired IP packet is absent, storing the management information corresponding to the IP packet identifier of the acquired IP packet in the storage.

11 Claims, 30 Drawing Sheets

(56) References Cited

U.S. PATENT DOCUMENTS

| | | | | |
|---|---|---|---|---|
| 2014/0362731 A1* | 12/2014 | Wijnands | ............... | H04L 12/18 370/254 |
| 2016/0112896 A1* | 4/2016 | Karampatsis | ..... | H04W 28/0252 370/230.1 |
| 2016/0142305 A1 | 5/2016 | Alawani et al. | | |

FOREIGN PATENT DOCUMENTS

| | | |
|---|---|---|
| JP | 2008-219127 | 9/2008 |
| JP | 2009-130528 | 6/2009 |
| JP | 2010-072955 | 4/2010 |
| WO | 2010/086907 | 8/2010 |

\* cited by examiner

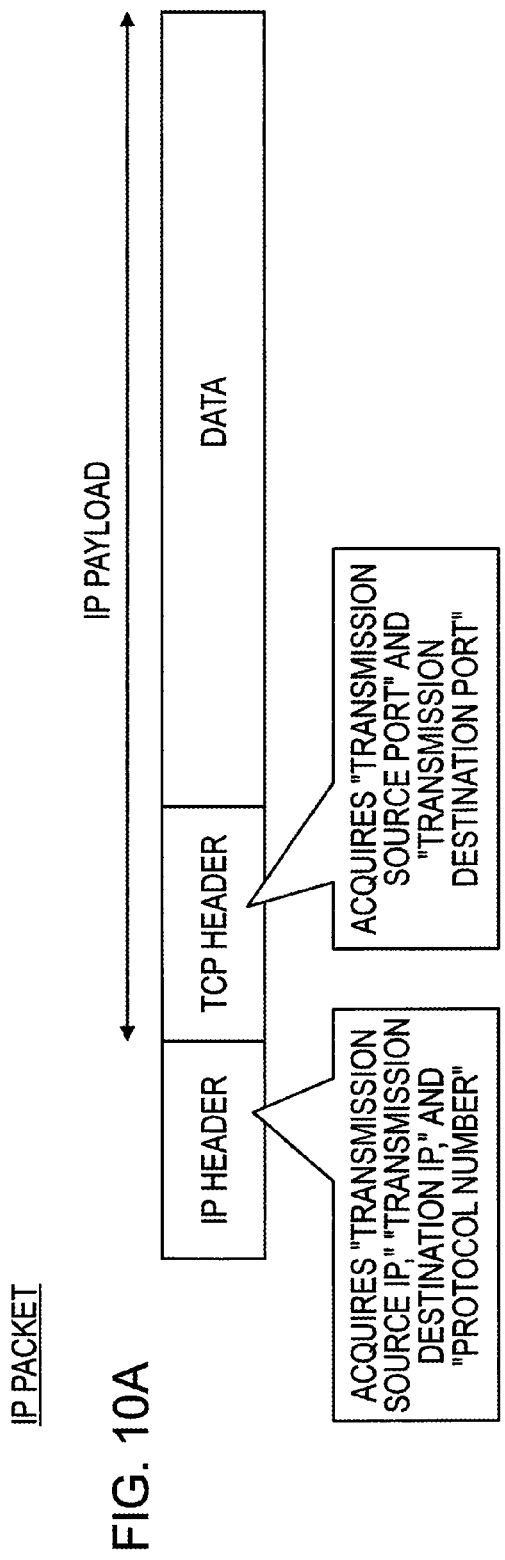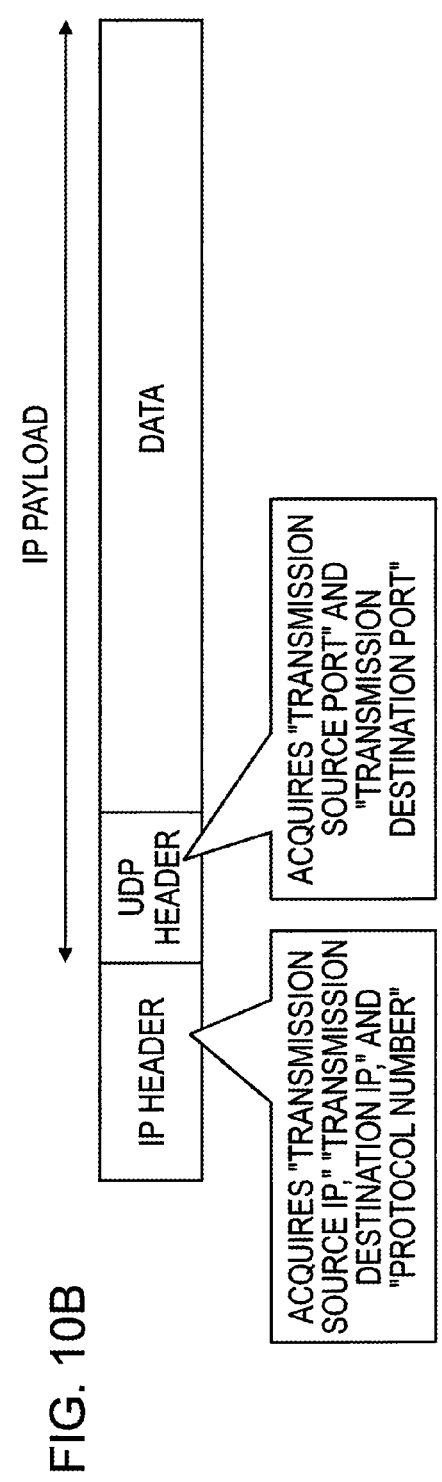

FIG. 11A

SESSION INFORMATION

| ID | TRANSMISSION SOURCE IP | TRANSMISSION DESTINATION IP | PROTOCOL NUMBER | TRANSMISSION SOURCE PORT | TRANSMISSION DESTINATION PORT |
|---|---|---|---|---|---|
| 1 | 10.20.30.40 | 10.20.30.50 | 6 | 2000 | 20 |
| 2 | 20.30.40.50 | 20.30.40.60 | 6 | 3000 | 80 |
| 3 | 30.40.50.60 | 30.40.60.70 | 17 | 4000 | 3000 |

FIG. 11B

STORAGE POSITION INFORMATION

| ID | LEADING STORAGE ADDRESS |
|---|---|
| 1 | P1 |
| 2 | P2 |
| 3 | P3 |

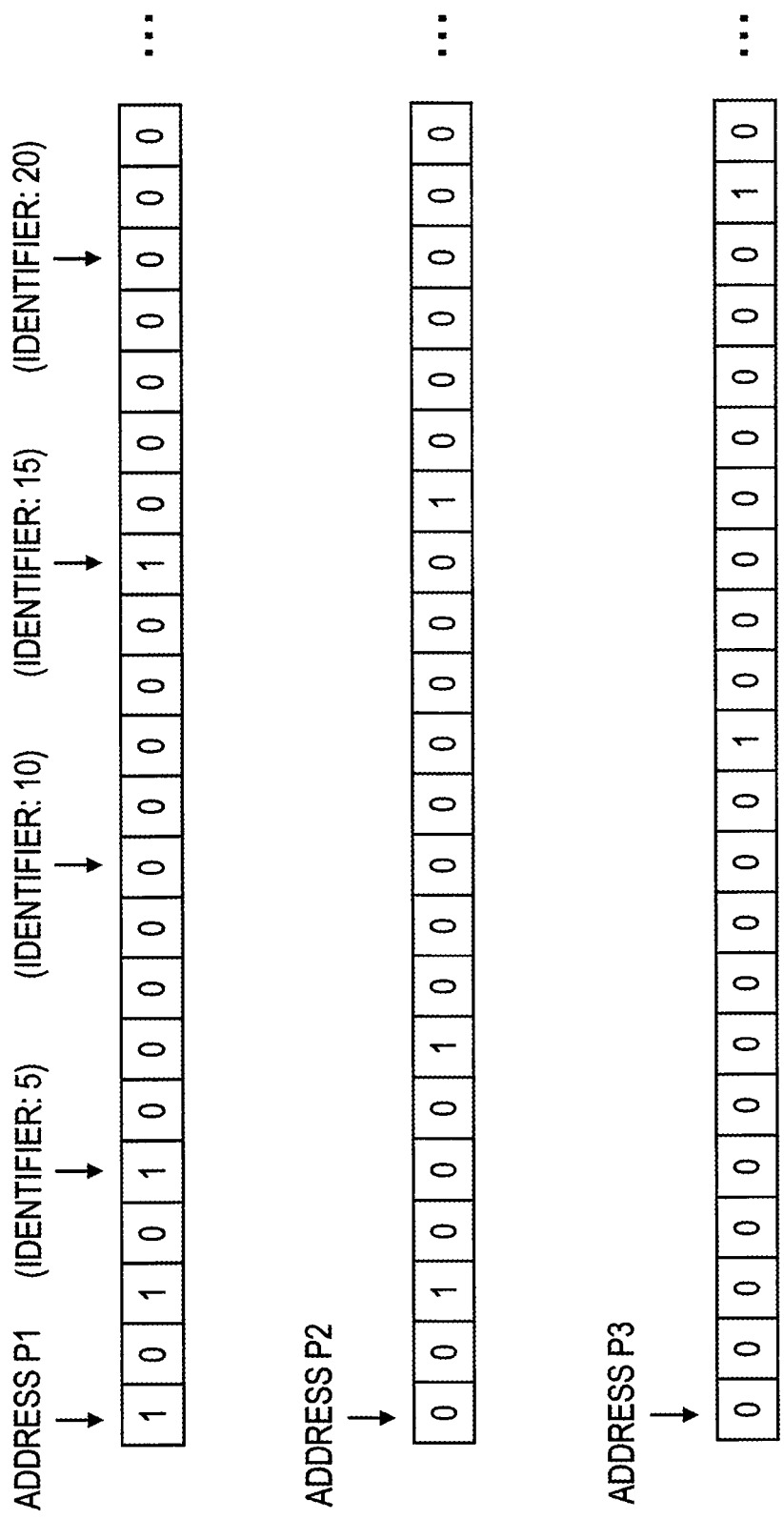

FIG. 16A

INITIALIZATION MANAGEMENT INFORMATION
(WHEN ACQUIRING PACKET OF IP IDENTIFIER "7018")

| WRITE FLAG | IP IDENTIFIER | UPDATE TIME |
|---|---|---|
|  | 101 | 13:25:14.001 |
|  | 1029 | 13:25:14.002 |
|  | 2974 | 13:25:14.003 |
|  | 4018 | 13:25:14.004 |
|  | 5663 | 13:25:14.005 |
| 1 | 7018 | 13:25:14.006 |
|  |  |  |
|  |  |  |
|  |  |  |

FIG. 16B

INITIALIZATION MANAGEMENT INFORMATION
(WHEN ACQUIRING PACKET OF IP IDENTIFIER "7024")

| WRITE FLAG | IP IDENTIFIER | UPDATE TIME |
|---|---|---|
|  | 101 | 13:25:14.001 |
|  | 1029 | 13:25:14.002 |
|  | 2974 | 13:25:14.003 |
|  | 4018 | 13:25:14.004 |
|  | 5663 | 13:25:14.005 |
| 1 | 7018⇒7024 | 13:25:14.006 |
|  |  |  |
|  |  |  |
|  |  |  |

FIG. 17A

INITIALIZATION MANAGEMENT INFORMATION
(WHEN ACQUIRING PACKET OF IP IDENTIFIER "7024")

| WRITE FLAG | IP IDENTIFIER | UPDATE TIME |
|---|---|---|
|  | 101 | 13:25:14.001 |
|  | 1029 | 13:25:14.002 |
|  | 2974 | 13:25:14.003 |
|  | 4018 | 13:25:14.004 |
|  | 5663 | 13:25:14.005 |
| 1 | 7024 | 13:25:14.006 |
|  |  |  |
|  |  |  |
|  |  |  |

FIG. 17B

INITIALIZATION MANAGEMENT INFORMATION
(WHEN ACQUIRING PACKET OF IP IDENTIFIER "7026")

| WRITE FLAG | IP IDENTIFIER | UPDATE TIME |
|---|---|---|
|  | 101 | 13:25:14.001 |
|  | 1029 | 13:25:14.002 |
|  | 2974 | 13:25:14.003 |
|  | 4018 | 13:25:14.004 |
|  | 5663 | 13:25:14.005 |
|  | 7024 | 13:25:14.006 |
| 1 | 7026 | 13:25:14.007 |
|  |  |  |
|  |  |  |

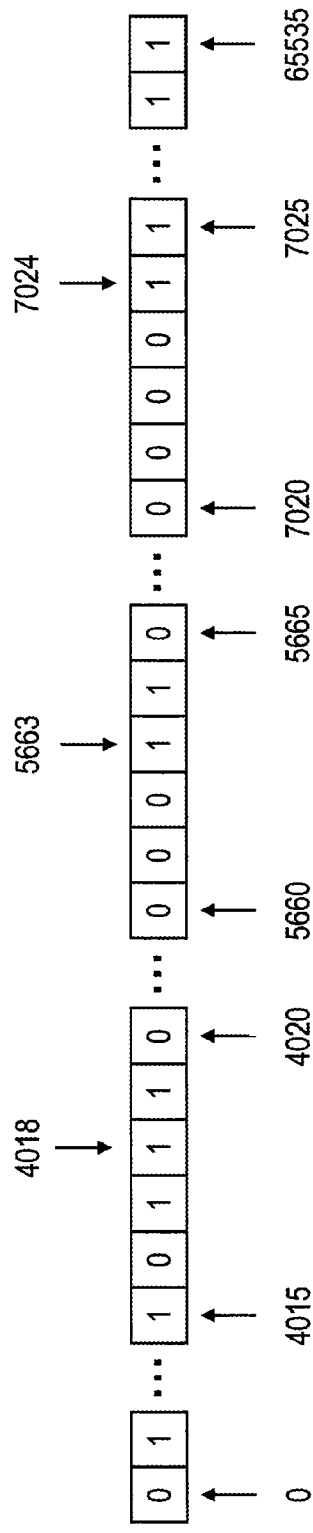
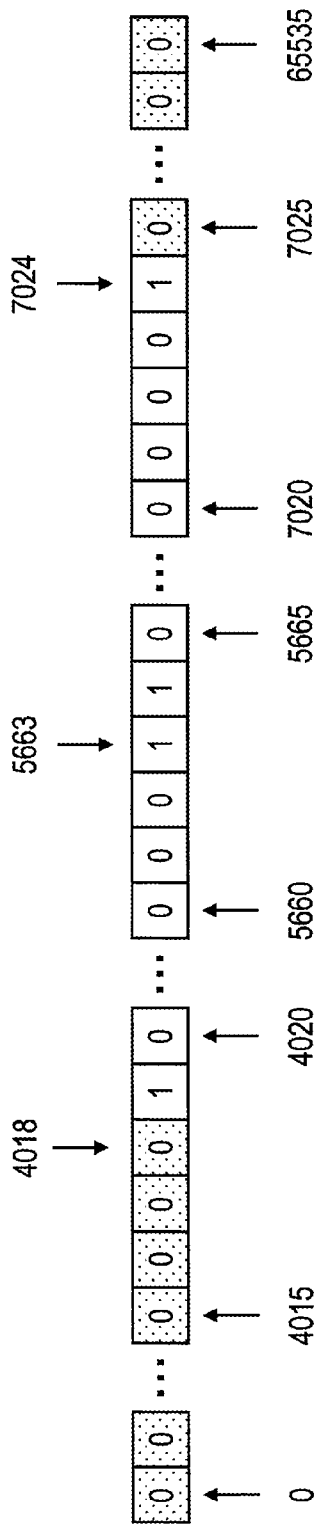
FIG. 18A
FIG. 18B

FIG. 19A

INITIALIZATION MANAGEMENT INFORMATION (WHEN ACQUIRING PACKET OF IP IDENTIFIER "13903")

| WRITE FLAG | IP IDENTIFIER | UPDATE TIME |
|---|---|---|
|  | 101 | 13:25:14.001 |
|  | 1029 | 13:25:14.002 |
|  | 2974 | 13:25:14.003 |
|  | 4018 | 13:25:14.004 |
|  | 5663 | 13:25:14.005 |
|  | 7024 | 13:25:14.006 |
|  | 8802 | 13:25:14.007 |
|  | 9011 | 13:25:14.008 |
|  | 12142 | 13:25:14.009 |
| 1 | 13903 | 13:25:14.010 |

FIG. 19B

INITIALIZATION MANAGEMENT INFORMATION (WHEN ACQUIRING PACKET OF IP IDENTIFIER "1976")

| WRITE FLAG | IP IDENTIFIER | UPDATE TIME |
|---|---|---|
| 1 | 101⇒14556 | 13:25:14.011 |
|  | 1029 | 13:25:14.012 |
|  | 2974 | 13:25:14.003 |
|  | 4018 | 13:25:14.004 |
|  | 5663 | 13:25:14.005 |
|  | 7024 | 13:25:14.006 |
|  | 8802 | 13:25:14.007 |
|  | 9011 | 13:25:14.008 |
|  | 12142 | 13:25:14.009 |
|  | 13903 | 13:25:14.010 |

FIG. 21A

INITIALIZATION MANAGEMENT INFORMATION

| WRITE FLAG | IP IDENTIFIER | UPDATE TIME |
|---|---|---|
|  | 101 | 13:25:14.000 |
|  | 2029 | 13:25:14.005 |
|  | 4974 | 13:25:14.010 |
|  | 5102 | 13:25:14.015 |
|  | 6932 | 13:25:14.020 |
| 1 | 10234 | 13:25:14.025 |
|  |  | 13:25:14.030 |
|  |  |  |
|  |  |  |

FIG. 21B

UPDATE CYCLE INFORMATION

| UPDATE CYCLE |
|---|
| 5 |

FIG. 21C

MAXIMUM ACQUISITION NUMBER INFORMATION

| MAXIMUM ACQUISITION NUMBER |
|---|
| 8614 |

FIG. 21D

UPDATE CYCLE THRESHOLD INFORMATION

| ACQUISITION NUMBER | UPDATE CYCLE (ms) |
|---|---|
| 0 ~ 5000 | 10 |
| 5000 ~ 10000 | 5 |
| 10000 ~ | 1 |

FIG. 22A

INITIALIZATION MANAGEMENT INFORMATION

| WRITE FLAG | IP IDENTIFIER | UPDATE TIME |
|---|---|---|
| | 101 | 13:25:14.000 |
| | 2029 | 13:25:14.005 |
| | 4974 | 13:25:14.010 |
| | 5102 | 13:25:14.015 |
| | 6932 | 13:25:14.020 |
| | 10234 | 13:25:14.025 |
| 1 | 27412 | 13:25:14.030 |
| | | 13:25:14.031 |
| | | |
| | | |

FIG. 22B

UPDATE CYCLE INFORMATION

| UPDATE CYCLE |
|---|
| 1 |

FIG. 22C

MAXIMUM ACQUISITION NUMBER INFORMATION

| MAXIMUM ACQUISITION NUMBER |
|---|
| 22438 |

FIG. 22D

UPDATE CYCLE THRESHOLD INFORMATION

| ACQUISITION NUMBER | UPDATE CYCLE (ms) |
|---|---|
| 0 ~ 5000 | 10 |
| 5000 ~ 10000 | 5 |
| 10000 ~ | 1 |

FIG. 27A

SESSION INFORMATION

| ID | TRANSMISSION SOURCE IP | TRANSMISSION DESTINATION IP | PROTOCOL NUMBER | TRANSMISSION SOURCE PORT | TRANSMISSION DESTINATION PORT | DETERMINATION START TIME |
|---|---|---|---|---|---|---|
| 1 | 10.20.30.40 | 10.20.30.50 | 6 | 2000 | 20 | 13:15:12.000 |
| 2 | 20.30.40.50 | 20.30.40.60 | 6 | 3000 | 80 | 13:15:22.000 |

PRESENT TIME ⇒ 13:15:25.000

FIG. 27B

STORAGE POSITION INFORMATION

| ID | LEADING STORAGE ADDRESS |
|---|---|
| 1 | P1 |
| 2 | P2 |

FIG. 27C

DETERMINATION EXECUTION INFORMATION

| ITEM | TIME (s) |
|---|---|
| DETERMINATION PERIOD | 10 |
| DETERMINATION STOP PERIOD | 10 |

FIG. 28A

SESSION INFORMATION

| ID | TRANSMISSION SOURCE IP | TRANSMISSION DESTINATION IP | PROTOCOL NUMBER | TRANSMISSION SOURCE PORT | TRANSMISSION DESTINATION PORT | DETERMINATION START TIME |
|---|---|---|---|---|---|---|
| 1 | 10.20.30.40 | 10.20.30.50 | 6 | 2000 | 20 | 13:15:35.000 |
| 2 | 20.30.40.50 | 20.30.40.60 | 6 | 3000 | 80 | 13:15:22.000 |

PRESENT TIME ⇒ 13:15:25.000

FIG. 28B

STORAGE POSITION INFORMATION

| ID | LEADING STORAGE ADDRESS |
|---|---|
| 1 | |
| 2 | P2 |

FIG. 28C

DETERMINATION EXECUTION INFORMATION

| ITEM | TIME (s) |
|---|---|
| DETERMINATION PERIOD | 10 |
| DETERMINATION STOP PERIOD | 10 |

FIG. 29A

SESSION INFORMATION

| ID | TRANSMISSION SOURCE IP | TRANSMISSION DESTINATION IP | PROTOCOL NUMBER | TRANSMISSION SOURCE PORT | TRANSMISSION DESTINATION PORT | DETERMINATION START TIME |
|---|---|---|---|---|---|---|
| 1 | 10.20.30.40 | 10.20.30.50 | 6 | 2000 | 20 | 13:15:35.000 |
| 2 | 20.30.40.50 | 20.30.40.60 | 6 | 3000 | 80 | 13:15:22.000 |

PRESENT TIME ⇒ 13:15:31.000

FIG. 29B

STORAGE POSITION INFORMATION

| ID | LEADING STORAGE ADDRESS |
|---|---|
| 1 | |
| 2 | P2 |

FIG. 29C

DETERMINATION EXECUTION INFORMATION

| ITEM | TIME (s) |
|---|---|
| DETERMINATION PERIOD | 10 |
| DETERMINATION STOP PERIOD | 10 |

FIG. 30A

SESSION INFORMATION

| ID | TRANSMISSION SOURCE IP | TRANSMISSION DESTINATION IP | PROTOCOL NUMBER | TRANSMISSION SOURCE PORT | TRANSMISSION DESTINATION PORT | DETERMINATION START TIME |
|----|---|---|---|---|---|---|
| 1 | 10.20.30.40 | 10.20.30.50 | 6 | 2000 | 20 | 13:15:35.000 |
| 2 | 20.30.40.50 | 20.30.40.60 | 6 | 3000 | 80 | 13:15:22.000 |

PRESENT TIME ⇒ 13:15:37.000

FIG. 30B

STORAGE POSITION INFORMATION

| ID | LEADING STORAGE ADDRESS |
|----|---|
| 1 | P1 |
| 2 | P2 |

FIG. 30C

DETERMINATION EXECUTION INFORMATION

| ITEM | TIME (s) |
|---|---|
| DETERMINATION PERIOD | 10 |
| DETERMINATION STOP PERIOD | 10 |

FIG. 31A

SESSION INFORMATION

| ID | TRANSMISSION SOURCE IP | TRANSMISSION DESTINATION IP | PROTOCOL NUMBER | TRANSMISSION SOURCE PORT | TRANSMISSION DESTINATION PORT | DETERMINATION START TIME |
|---|---|---|---|---|---|---|
| 1 | 10.20.30.40 | 10.20.30.50 | 6 | 2000 | 20 | 13:15:35.000 |
| 2 | 20.30.40.50 | 20.30.40.60 | 6 | 3000 | 80 | 0 |

PRESENT TIME => 13:15:41.000

FIG. 31B

STORAGE POSITION INFORMATION

| ID | LEADING STORAGE ADDRESS |
|---|---|
| 1 | P1 |
| 2 | P2 |

FIG. 31C

DETERMINATION EXECUTION INFORMATION

| ITEM | TIME (s) |
|---|---|
| DETERMINATION PERIOD | 10 |
| DETERMINATION STOP PERIOD | 10 |

PACKET PROCESSING PROGRAM, PACKET PROCESSING APPARATUS, AND PACKET PROCESSING METHOD

CROSS-REFERENCE TO RELATED APPLICATION

This application is based upon and claims the benefit of priority of the prior Japanese Patent Application No. 2014-148993, filed on Jul. 22, 2014, the entire contents of which are incorporated herein by reference.

FIELD

The present invention relates to a packet processing program, a packet processing apparatus, and a packet processing method.

BACKGROUND

In a system or network in operation, for example, communication packets (hereinafter also simply referred to as packets) flowing in the network are sometimes acquired and analyzed to grasp an operation state. The acquisition of the communication packets is performed by providing capture points in places where the analysis target communication packets pass. In general, the capture points are provided in a plurality of places in order to make it possible to comprehensively acquire the communication packets needed for the analysis.

The communication packets sometimes pass a plurality of capture points depending on a network configuration and the like. In this case, the analysis of the communication packets is performed assuming that the same packet is generated a plurality of times. Therefore, when such communication packets are generated, in the analysis of the communication packets, the number of communication packets may be sometimes unable to be correctly calculated. Further, for example, it is sometimes determined that retransmission is performed because a packet loss occurs. Therefore, in general, the analysis of the communication packets is executed after a redundancy check of received communication packets is performed (see, for example, WO 2010/086907, Japanese Patent Application Laid-Open No. 2009-130528, Japanese Patent Application Laid-Open No. 2008-219127, and Japanese Patent Application Laid-Open No. 2010-72955).

SUMMARY

The redundancy check of communication packets is performed by, for example, storing communication packets acquired in the past and, when a new communication packet is acquired, determining whether the acquired communication packet is the same as a stored communication packet. When the acquired communication packet is the same as the stored communication packet, for example, the acquired communication packet is determined as a redundant packet and discarded.

However, the redundancy check of communication packets is performed by, for example, matching entire data included in the acquired communication packets and entire data included in the stored communication packets. Therefore, the redundancy check causes an increase in a processing load on a CPU or the like depending on, for example, the number of communication packets that need to be matched. Further, when a frequency of occurrence of the redundancy check exceeds a processing ability of the CPU or the like, an overflow occurs and the redundancy check is sometimes not correctly performed.

According to a first aspect of the embodiment, a non-transitory computer-readable storage medium storing therein a packet processing program for causing a computer to execute a process includes: specifying, according to acquisition of an IP packet, on the basis of information for specifying a communication session included in a header of the acquired IP packet, a communication session in which the acquired IP packet is transmitted and received, referring to management information corresponding to the specified communication session, the management information, corresponding to IP packet identifiers included in headers of IP packets and corresponding to a communication session, being stored in a storage, and discarding the acquired IP packet when the management information corresponding to an IP packet identifier of the acquired IP packet is present in the storage and, when the management information corresponding to the IP packet identifier of the acquired IP packet is absent in the storage, storing the management information corresponding to the IP packet identifier of the acquired IP packet in the storage and outputting the acquired IP packet.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10A and FIG. 10B are diagrams for explaining details of the redundant packet detection processing in the first embodiment.

FIG. 11A and FIG. 11B are diagrams for explaining details of the redundant packet detection processing in the first embodiment.

FIG. 12 is diagram for explaining details of the redundant packet detection processing in the first embodiment.

FIG. 16A and FIG. 16B are diagrams for explaining the redundant packet detection processing in the second embodiment.

FIG. 17A and FIG. 17B are diagrams for explaining the redundant packet detection processing in the second embodiment.

FIG. 18A and FIG. 18B are diagrams for explaining the redundant packet detection processing in the second embodiment.

FIG. 19A and FIG. 19B are diagrams for explaining the redundant packet detection processing in the second embodiment.

FIGS. 21A to 21D are diagrams for explaining the redundant packet detection processing in the third embodiment.

FIGS. 22A to 22D are diagrams for explaining the redundant packet detection processing in the third embodiment.

FIGS. 27A to 27C are diagrams for explaining the redundant packet detection processing in the fourth embodiment.

FIGS. 28A to 28C are diagrams for explaining the redundant packet detection processing in the fourth embodiment.

FIGS. 29A to 29C are diagrams for explaining the redundant packet detection processing in the fourth embodiment.

FIGS. 30A to 30C are diagrams for explaining the redundant packet detection processing in the fourth embodiment.

FIGS. 31A to 31C are diagrams for explaining the redundant packet detection processing in the fourth embodiment.

DESCRIPTION OF EMBODIMENTS

Configuration of an Information Processing System

Figure 1:
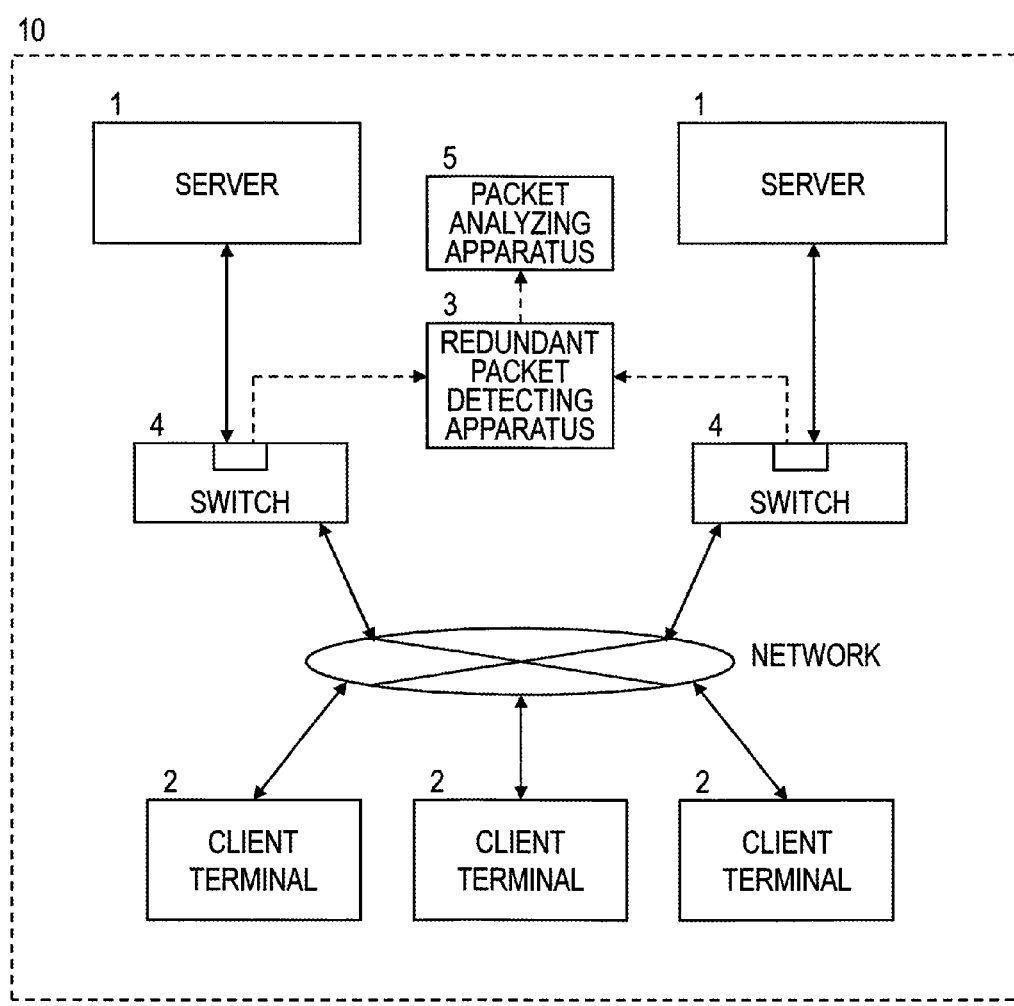
FIG. 1 is a diagram depicting the overall configuration of an information processing system.

FIG. 1 is a diagram depicting the overall configuration of an information processing system. In an information processing system 10 depicted in FIG. 1, servers 1, client terminals 2, a packet processing apparatus 3 (hereinafter also referred to as redundant packet detecting apparatus 3), and a packet analyzing apparatus 5 are set. The servers 1 and the client terminals 2 are accessible to each other via a network such as the Internet or an intranet. In an example depicted in FIG. 1, the packet analyzing apparatus 5 is connected to switches 4, which are connected to the servers 1 and the like, via the redundant packet detecting apparatus 3. Note that the information processing system 10 depicted in FIG. 1 includes two servers 1. However, the number of servers may be other than two. The information processing system 10 depicted in FIG. 1 includes three client terminals 2. However, the number of client terminals may be other than three.

For example, the server 1 executes processing according to a processing request from the client terminal 2 and returns a result of the processing to the client terminal 2. Specifically, the processing executed in the server 1 is, for example, processing for managing information such as a schedule of a user input by the user from the client terminal 2 and may be processing for causing the client terminal to display requisite information according to a processing request from the user. The processing executed in the server 1 is, for example, processing for managing information such as schedules of a plurality of users input by the users and may be processing for causing the client terminal 2 to collectively display the schedules of all the users according to processing requests from the users.

For example, the client terminal 2 transmits a processing request to the server 1 and receives a result of processing. The client terminal 2 is, for example, a stationary terminal such as a desktop PC or a remote terminal such as a cellular phone.

In the example depicted in FIG. 1, the switches 4 are disposed between the servers 1 and the network. The switches 4 include, for example, mirror ports (not depicted in the figure). For example, the mirror ports duplicate communication packets flowing through the network and respectively output the duplicated communication packets. In the example depicted in FIG. 1, for example, the mirror ports of the switches 4 duplicate communication packets transmitted from the network to the server 1 and transmit, to the redundant packet detecting apparatus 3, communication packets same as the communication packets transmitted to the servers 1. In the example depicted in FIG. 1, network taps may be set separately from the switches 4 to duplicate communication packets flowing through the network. Note that, in the following explanation, it is assumed that the communication packets are IP packets transmitted and received in an Internet Protocol (IP).

For example, the packet analyzing apparatus 5 acquires communication packets flowing through the network and analyzes the communication packets in order to monitor operation states of the servers 1 and the network. Specifically, the packet analyzing apparatus 5 performs, for example, an analysis concerning the number of communication packets flowing through the network within a unit time and presence or absence of occurrence of a packet loss (an analysis in a layer 4 level) and an analysis concerning a response time including the operation of an application (an analysis in a layer 7 level). The packet analyzing apparatus 5 may process and output an analysis result according to a request of a system administrator or the like.

The redundant packet detecting apparatus 3 acquires, from the network, communication packets to be analyzed in the packet analyzing apparatus 5 and transmits the communication packets to the packet analyzing apparatus 5. For example, before transmitting the acquired communication packets to the packet analyzing apparatus 5, the redundant packet detecting apparatus 3 performs a redundancy check and excludes a detected redundant packet. Consequently, the packet analyzing apparatus 5 can perform the analysis of the communication packets in a state in which the redundant packet is excluded.

The Redundant Packet Detecting Apparatus and Capture Points

Figure 2:
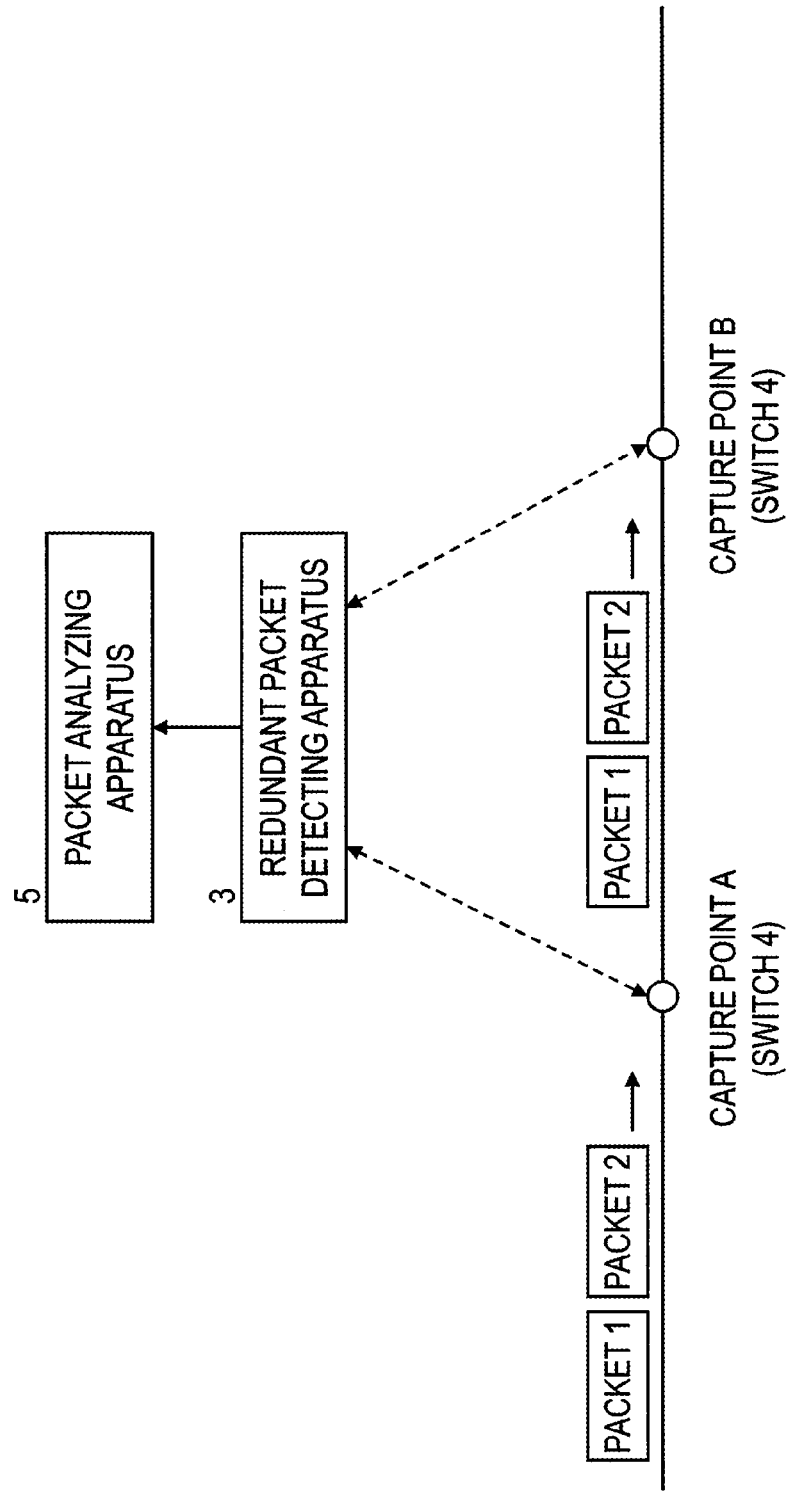
FIG. 2 is a diagram for explaining a relation between the redundant packet detecting apparatus and the capture points.

The redundant packet detecting apparatus 3 and capture points are explained. FIG. 2 is a diagram for explaining a relation between the redundant packet detecting apparatus and the capture points.

As depicted in FIG. 2, the capture points are places where the redundant packet detecting apparatus 3 acquires communication packets in the network. The communication packets are sometimes transmitted through different communication routes depending on differences of types of services concerning the communication packets and administrators of networks. Therefore, in general, the capture points are provided in a plurality of places. Consequently, it is possible to comprehensively acquire communication packets needed to perform the analysis.

The analysis target communication packets sometimes pass a plurality of capture points (a capture point A and a capture point B depicted in FIG. 2) depending on route setting and the like in an apparatus on the network. In this case, the analysis of the communication packets in the packet analyzing apparatus 5 is performed assuming that the same communication packet is generated a plurality of times. Therefore, in general, the redundant packet detecting apparatus 3 applies a redundancy check to the acquired communication packets and transmits the communication packets to the packet analyzing apparatus 5 in a state in which a redundant packet is excluded.

In order to perform the redundancy check, communication packets acquired in the past are stored and, when a communication packet is received anew, matching of the communication packet with the stored communication packets is performed. Therefore, the redundant packet detecting apparatus 3 stores all of acquired communication packets in order to perform the redundancy check. Every time a new communication packet is acquired, the redundant packet detecting apparatus 3 performs matching of the acquired communication packet and the stored communication packets and, when determining that the acquired communication packet is a redundant packet, performs processing for discarding the acquired communication packet. However, for example, when communication packets are transmitted and received by a high-speed communication line (e.g., a communication line having communication speed of 10 (Gbps)), the number of communication packets that the redundant packet detecting apparatus 3 needs to store is enormous. Therefore, in this case, the number of times the matching is performed increases. A processing load on a CPU or the like of the redundant packet detecting apparatus 3 increases.

In this regard, for example, Japanese Patent Application Laid-Open No. 2010-72955 discloses that, for the purpose of performing, for example, measurement of a communication amount of communication packets, matching of a communication packet acquired anew and periodically-sampled communication packets is performed. However, when the redundant packet is excluded as explained above, all of acquired communication packets need to be stored. Therefore, compared with when the periodically-sampled communication packets are stored, a processing load on the CPU or the like during the matching is considerably different.

When a frequency of occurrence of the redundancy check exceeds a processing ability of the CPU or the like, an overflow occurs and the redundancy check is sometimes not correctly performed.

Therefore, in this embodiment, when management information corresponding to an IP packet identifier (hereinafter also referred to as IP identifier) included in an acquired communication packet is present, the acquired packet is discarded. When the management information is absent, management information of the acquired packet is stored, whereby a redundant packet is excluded.

Configuration of the Redundant Packet Detecting Apparatus

Figure 3:
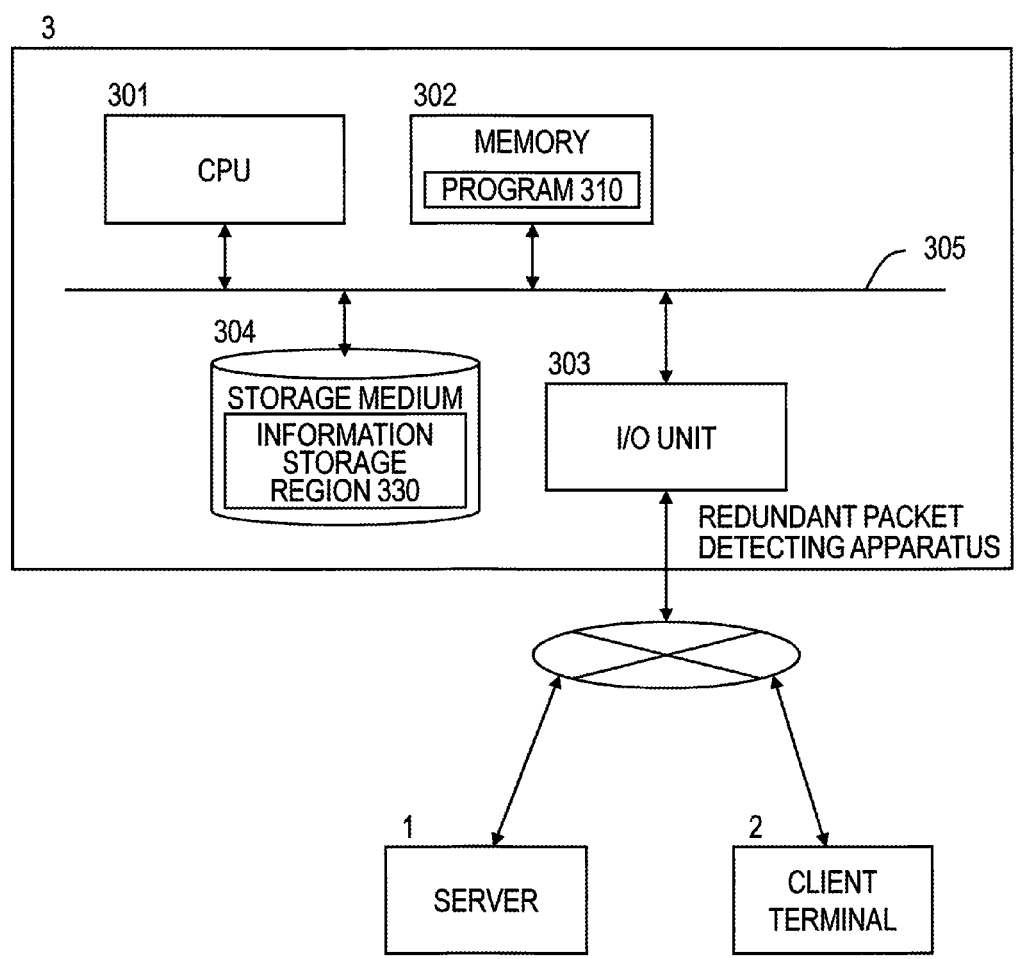
FIG. 3 is a diagram depicting the hardware configuration of the redundant packet detecting apparatus.

First, the configuration of the redundant packet detecting apparatus 3 is explained. FIG. 3 is a diagram depicting the hardware configuration of the redundant packet detecting apparatus. The redundant packet detecting apparatus 3 includes a CPU 301, which is a processor, a memory 302, an external interface (an I/O unit) 303, and a storage medium (a storage) 304. The units are connected to one another via a bus 305. The storage medium 304 has stored, for example, in a program storage region (not depicted in the figure) in the storage medium 304, a computer program 310 (hereinafter also referred to as packet processing program or redundant packet detecting program) for performing processing for detecting a redundant packet (hereinafter also referred to as redundant packet detection processing). As depicted in FIG. 3, during execution of the computer program 310, the CPU 301 loads the computer program 310 from the storage medium 304 to the memory 302 and performs the redundant packet detection processing in cooperation with the program 310. The storage medium 304 includes, for example, an information storage region 330 (hereinafter also referred to as storing unit 330) that stores information used when the redundant packet detection processing is performed.

Figure 4:
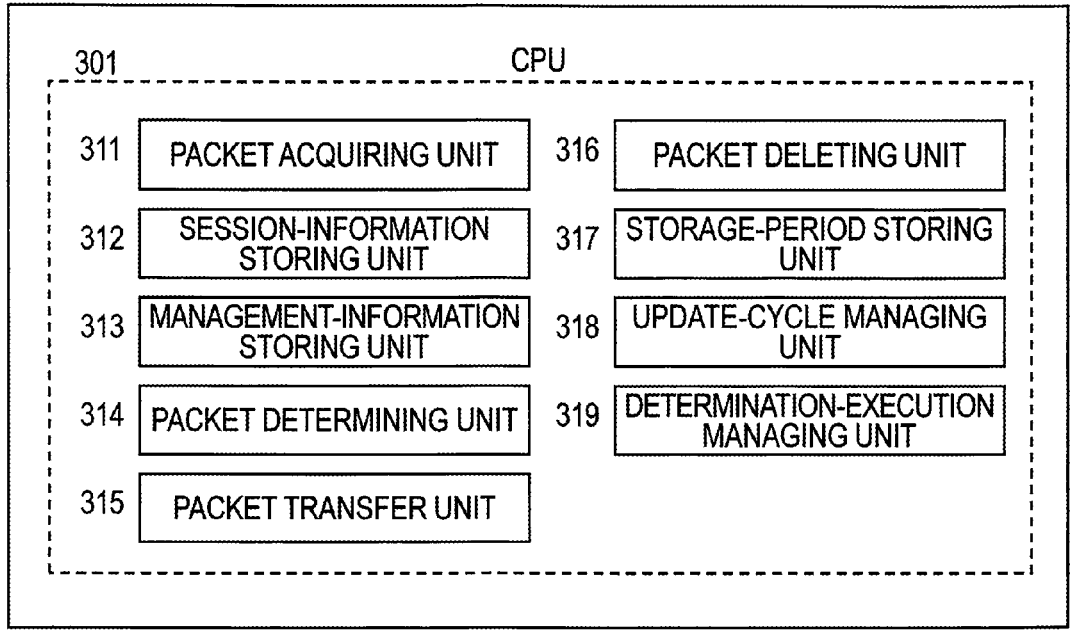
FIG. 4 is a block diagram concerning functions of the redundant packet detecting apparatus depicted in FIG. 3.

FIG. 4 is a block diagram concerning functions of the redundant packet detecting apparatus depicted in FIG. 3.

Figure 5:
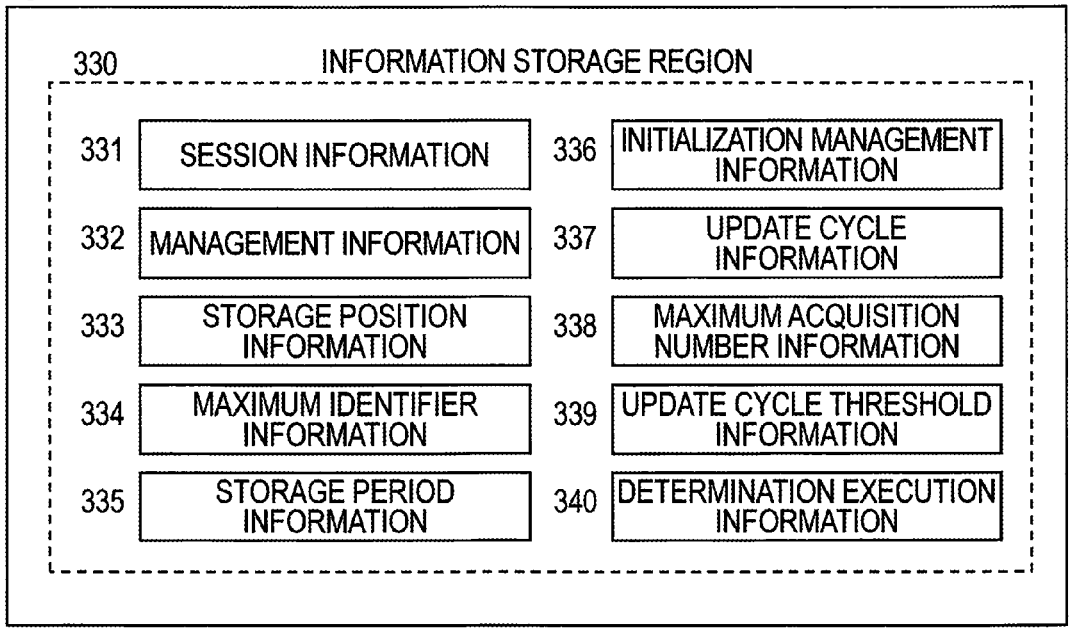
FIG. 5 is a block diagram concerning the information stored in the information storage region depicted in FIG. 3.

FIG. 5 is a block diagram concerning the information stored in the information storage region depicted in FIG. 3. The CPU 301 cooperates with the computer program 310 to thereby operate as, for example, a packet acquiring unit 311, a session-information storing unit 312, a management-information storing unit 313, a packet determining unit 314, and a packet transfer unit 315. The CPU 301 cooperates with the computer program 310 to thereby operate as, for example, a packet deleting unit 316, a storage-period storing unit 317, an update-cycle managing unit 318, and a determination-execution managing unit 319. Note that, in the following explanation, a part or all of the units are referred to as processing units.

In the information storage region 330, for example, session information 331, management information 332, storage position information 333, maximum identifier information 334, and storage period information 335 are stored. In the information storage region 330, for example, initialization management information 336, update cycle information 337, maximum acquisition number information 338, update cycle threshold information 339, and determination execution information 340 are stored.

The packet acquiring unit 311 acquires, for example, communication packets to be analyzed in the packet analyzing apparatus 5. The packet acquiring unit 311 acquires the communication packets, for example, in one or more capture points provided on a network through which the communication packets to be acquired are transmitted.

The session-information storing unit 312 stores, in the information storage region 330, as the session information 331, for example, information (information for specifying a communication session) concerning a communication session (hereinafter also referred to as session) in which the communication packets acquired by the packet acquiring unit 311 are transmitted and received. The communication session is established between terminals (e.g., the servers 1 and the client terminals 2) that transmit and receive the communication packets. The communication session is a logical connection relation between the terminals that transmit and receive the communication packets. In the following explanation, when the transmission and reception of the communication packets are performed, it is assumed that the communication session needs to be established between the terminals that perform the transmission and reception of the communication packets. Note that details of the session information 331 are explained below.

The management-information storing unit 313 stores, for example, the management information 332 in the information storage region 330. The management information 332 is information stored for each communication session to correspond to an IP identifier included in an IP header of a communication packet. The IP header includes a "transmission source IP", which is information for specifying a transmission source terminal of the communication packet (an IP packet), and a "transmission destination IP", which is information for specifying a transmission destination terminal. The IP header is added to communication packets. The IP identifier is allocated to each transmission session in transmission order (generation order) in the transmission source terminal of the communication packet. When a communication packet generated in a certain communication session exceeds a maximum (e.g., 65535) of the IP identifier, the IP identifier may be allocated from the first identifier (e.g., 0) again (this is hereinafter also referred to as cycling).

Specifically, the management-information storing unit 313 stores, for example, according to acquisition of a communication packet, the management information 332 corresponding to an IP identifier of the acquired communication packet. In this case, the management-information storing unit 313 may store, for example, only the management information 332 corresponding to the IP identifier of the acquired communication packet in the information storage region 330. In this case, the management-information managing unit 313 may store, for example, second information (e.g., 0) in advance in the information storage region 330 in which the management information 332 is stored. Further, for example, when a communication packet is acquired, the management-information managing unit 313 may update the management information 332, which is stored in the information storage region 330, corresponding to an IP identifier of the acquired communication packet, to first information (e.g., 1).

Note that storage positions of the management information 332 may be stored in the storage position information 333.

Further, the management-information storing unit 313 may store, for example, a maximum of IP identifiers of acquired communication packets as the maximum identifier information 334. For example, when a value obtained by subtracting the maximum identifier information 334 from an IP identifier of a communication packet acquired anew is smaller than a predetermined threshold (e.g., −30000), the management-information storing unit 313 may determine that the IP identifier has cycled. That is, since IP identifiers are allocated in transmission order of communication packets, except when a network delay or the like occurs, the IP identifier of the communication packet acquired anew is larger than the maximum identifier information 334. Therefore, when the IP identifier of the communication packet acquired anew is considerably smaller than the maximum identifier information 334, the management-information storing unit 313 can determine that cycling of the IP identifier occurs.

Note that, in this case, the management-information storing unit 313 may store, for example, second information in the management information 332 corresponding to a predetermined number of IP identifiers from a first IP identifier among IP identifiers that could be generated (e.g., a former half of the IP identifiers that could be generated). Further, when the IP identifier of the acquired communication packet reaches an IP identifier corresponding to the management information 332 in which the first information is stored (e.g., an identifier in the middle of the IP identifiers that could be generated), the management-information storing unit 313 may store the first information in the management information 332 corresponding to the next predetermined number of IP identifiers continuous to the IP identifier corresponding to the management information 332 in which the second information is stored (e.g., a latter half of the IP identifiers that could be generated). That is, when the IP identifier has cycled, a communication packet having the same IP identifier is generated a plurality of times. Therefore, before a communication packet including an IP identifier allocated in the past is acquired, the second information is stored (initialized) in the information storage region 330 in which the management information 332 corresponding to the communication packet is stored. A specific example of the management information 332 is explained below. Details of a case in which the IP identifier cycles are explained below.

Further, the management-information storing unit 313 may store the second information in the management information 332, a storage period of which after the storage of the first information in the management information 332 elapses, referring to, for example, the storage period information 335 in which a storage period of the management information 332 is stored and the initialization management information 336 for managing time when the first information is stored in the management information 332. Specifically, for example, in each of continuous totaling periods, the management-information storing unit 313 stores, on the basis of the initialization management information 336, the IP identifiers of the communication packet, for which the first information of which is stored in the management information 332. For example, the management-information storing unit 313 may store the second information in the management information 332 corresponding to the IP identifier stored in a totaling period in which a period having passed the storage period information 335.

For example, when a communication packet is acquired, the packet determining unit 314 refers to the management information 332 of a communication session same as a communication session of the acquired communication packet. When the management information 332 corresponding to an IP identifier of the acquired communication packet is present (the first information is stored), the packet determining unit 314 discards the acquired communication packet. For example, when a communication packet is acquired, when the management information 332 corresponding to an IP identifier of the acquired communication packet is absent (the second information is stored), the packet determining unit 314 stores the management information 332 corresponding to the IP identifier of the acquired communication packet.

For example, when the packet determining unit 314 determines that the management information 332 corresponding to the IP identifier of the acquired communication packet is present, the packet transfer unit 315 outputs the acquired communication packet. Specifically, the packet transfer unit 315 transmits the acquired communication packet to the packet analyzing apparatus 5. For example, before transferring the acquired communication packet to the packet analyzing apparatus 5, the packet transfer unit 315 may store the acquired communication packet in the redundant packet detecting apparatus 3 (e.g., the information storage region 330). For example, the packet transfer unit 315 may store the acquired communication packet in a region accessible by the packet analyzing apparatus 5 (e.g., a storage region in the packet analyzing apparatus 5). The packet analyzing apparatus 5 may access the region to thereby acquire the communication packet.

For example, when the packet determining unit 314 determines that the management information 332 corresponding to the IP identifier of the acquired communication packet is present, the packet deleting unit 316 discards the acquired communication packet.

The storage-period storing unit 317 stores, in the information storage region 330, as the storage period information 335, for example, a period in which the management information 332 is stored (e.g., 10 (ms)).

The update-cycle managing unit 318 updates the length of the totaling period, for example, on the basis of an acquisition frequency of a communication packet. Specifically, the update-cycle managing unit 318 continuously measures (acquires), for example, the number of communication packets acquired by the packet acquiring unit 311 at every predetermined time (e.g., 30 (ms)). The update-cycle managing unit 318 stores, for example, a maximum among the numbers of communication packets acquired at every unit time in the information storage region 330 as the maximum acquisition number information 338. The update-cycle managing unit 318 may update the totaling period, for example, referring to the update cycle threshold information 339 stored in association with the maximum acquisition number information 338 and the totaling period.

For example, when discarding of a communication packet by the packet deleting unit 316 does not occur in a determination period (e.g., 20 (ms)) set in advance, the determination-execution managing unit 319 instructs the packet determining unit 314 to stop the reference to the management information 332. For example, after the reference to the management information 332 by the packet determining unit 314 is stopped and after a determination stop period (e.g., 10 (ms)) elapses, the determination-execution managing unit 319 may instruct the packet determining unit 314 to resume the reference to the management information 332. Further, for example, when instructing the packet determining unit 314 to stop the reference to the management information 332, the determination-execution managing unit 319 may instruct the management-information storing unit 313 to erase the management information 332, the reference to which is stopped. Note that, for example, the determination period and the determination stop period may be stored in the determination execution information 340 set in advance. For example, the determination-execution managing unit 319 may give the instruction to the packet determining unit 314 referring to the determination execution information 340.

First Embodiment

Figure 6:
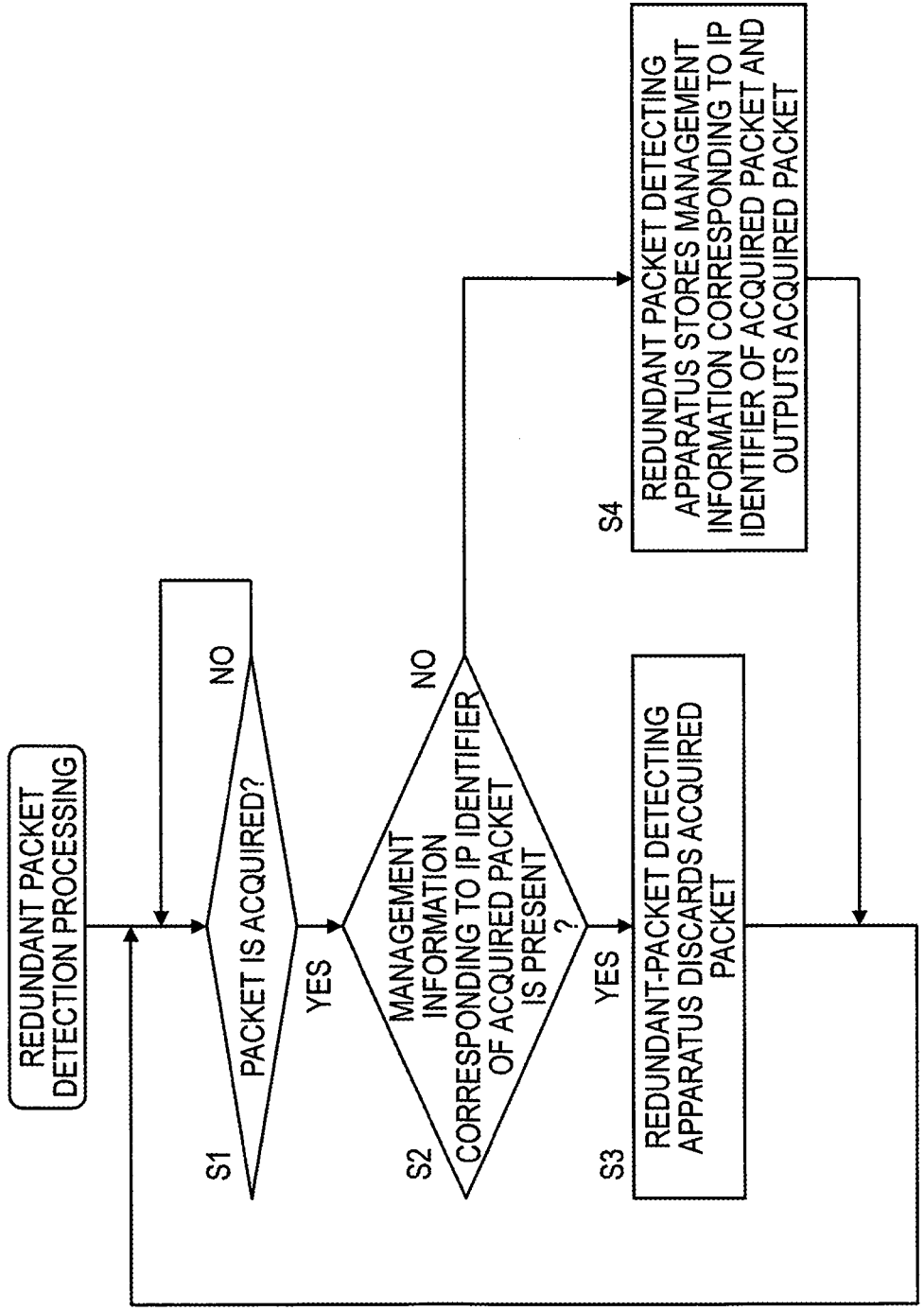
FIG. 6 is a flowchart for explaining an overview of redundant packet detection processing in the first embodiment.

A first embodiment is explained below. FIG. 6 is a flowchart for explaining an overview of redundant packet detection processing in the first embodiment.

First, when the redundant packet detecting apparatus 3 acquires a communication packet from a capture point (S1), the redundant packet detecting apparatus 3 checks whether the management information 332 corresponding to an IP identifier included in an IP header of the acquired communication packet is present (S2). When the management information 332 corresponding to the acquired communication packet is present (YES in S2), the redundant packet detecting apparatus 3 discards the acquired communication packet (S3). On the other hand, when the management information 332 corresponding to the acquired communication packet is absent (NO in S2), the redundant packet detecting apparatus 3 regards the management information 332 corresponding to the IP identifier of the acquired communication packet as acquired. Further, for example, the redundant packet detecting apparatus 3 outputs the acquired communication packet (S4).

That is, when the management information 332 corresponding to the acquired communication packet is present, the redundant packet detecting apparatus 3 determines that a communication packet same as the acquired communication packet has already been acquired (already been transmitted to the packet analyzing apparatus 5). Therefore, in this case, the redundant packet detecting apparatus 3 discards the acquired communication packet. When the management information 332 corresponding to the acquired communication packet is absent, the redundant packet detecting apparatus 3 determines that a communication packet same as the acquired communication packet is not acquired yet. Therefore, in this case, the redundant packet detecting apparatus 3 stores the management information 332 corresponding to the acquired communication packet. Consequently, when a redundant packet of the acquired communication packet is received thereafter, it is possible to discard the redundant packet.

In this way, according to the first embodiment, for example, when a communication packet is acquired, the redundant packet detecting apparatus 3 refers to the management information 332 of a communication session same as a communication session of the acquired communication packet among the management information 332 corresponding to an IP identifier included in an IP header of the communication packet in each communication session established between terminals that transmit and receive communication packets stored in the storing unit 330. When the management information 332 corresponding to the IP identifier of the acquired communication packet is present, the redundant packet detecting apparatus 3 discards the acquired communication packet. When the management information 332 corresponding to the IP identifier of the acquired communication packet is absent, the redundant packet detecting apparatus 3 stores the management information 332 corresponding to the IP identifier of the acquired communication packet. Consequently, when a communication packet is acquired, the redundant packet detecting apparatus 3 can perform the redundancy check of the acquired communication packet by referring to only the management information 332 corresponding to the acquired communication packet. Therefore, when performing matching of a communication packet acquired new and communication packets acquired in the past, the redundant packet detecting apparatus 3 does not need to perform retrieval of information on the communication packet acquired anew out of information on the communication packets acquired in the past. Therefore, the redundant packet detecting apparatus 3 can reduce a processing load on the CPU or the like during the matching. The redundant packet detecting apparatus 3 does not need to store all of the communication packets acquired in the past in order to perform the redundancy check. Therefore, it is possible to reduce the capacity of a storage region in use.

Note that the information storage region 330 may include, for example, storage regions (e.g., storage regions capable of storing 1-bit information) in which the management information 332 corresponding to IP identifiers that could be generated can be respectively stored. In this case, the redundant packet detecting apparatus 3 stores in advance, for example, 0 (the first information) in all storage regions corresponding to the IP identifiers that could be generated. When a communication packet is acquired, the redundant packet detecting apparatus 3 may update the storage region corresponding to an IP identifier of the acquired communication packet to 1 (the second information).

Details of the First Embodiment

Figure 7:
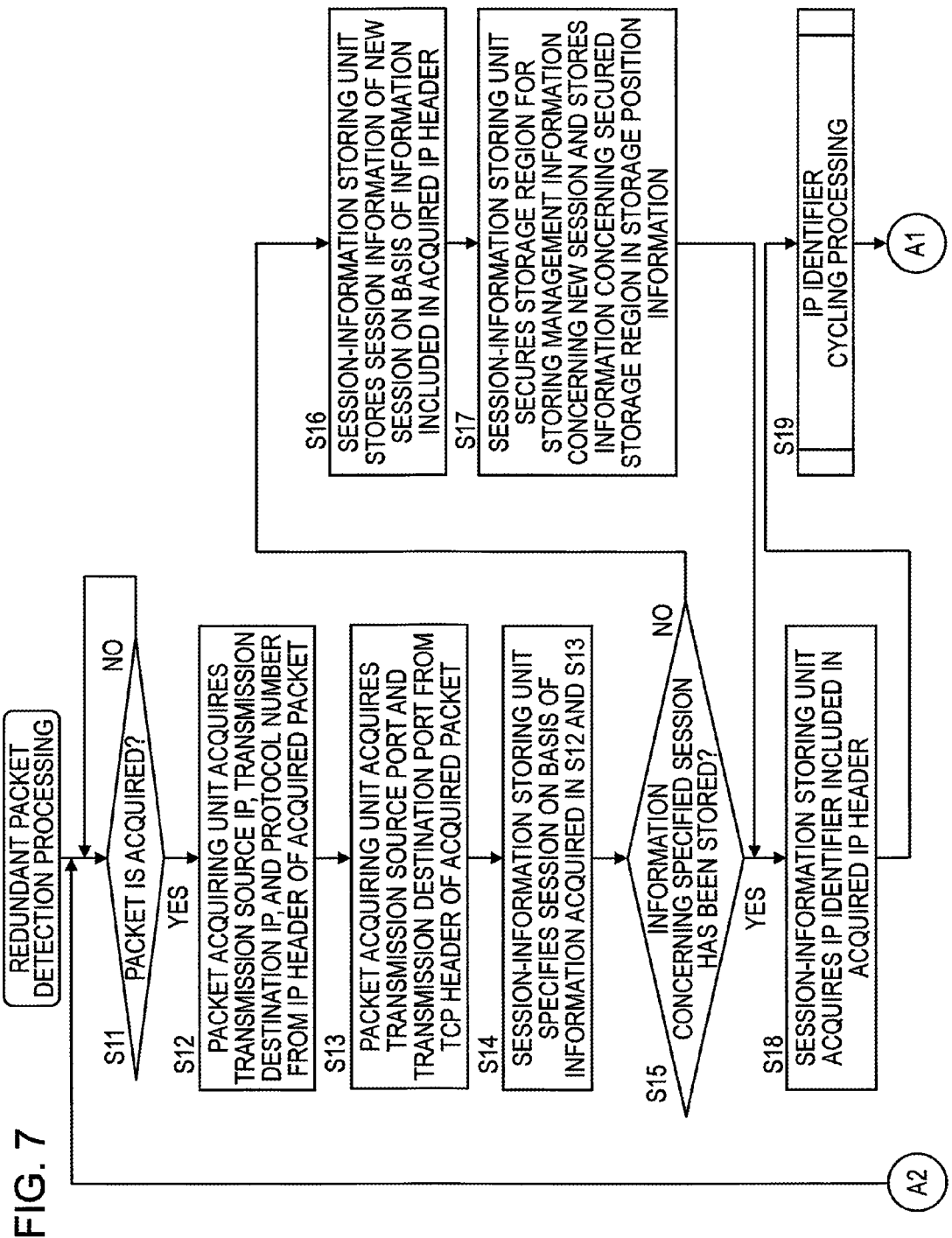
FIGS. 7 to 9 are flowcharts for explaining details of the redundant packet detection processing in the first embodiment.
Figure 8:
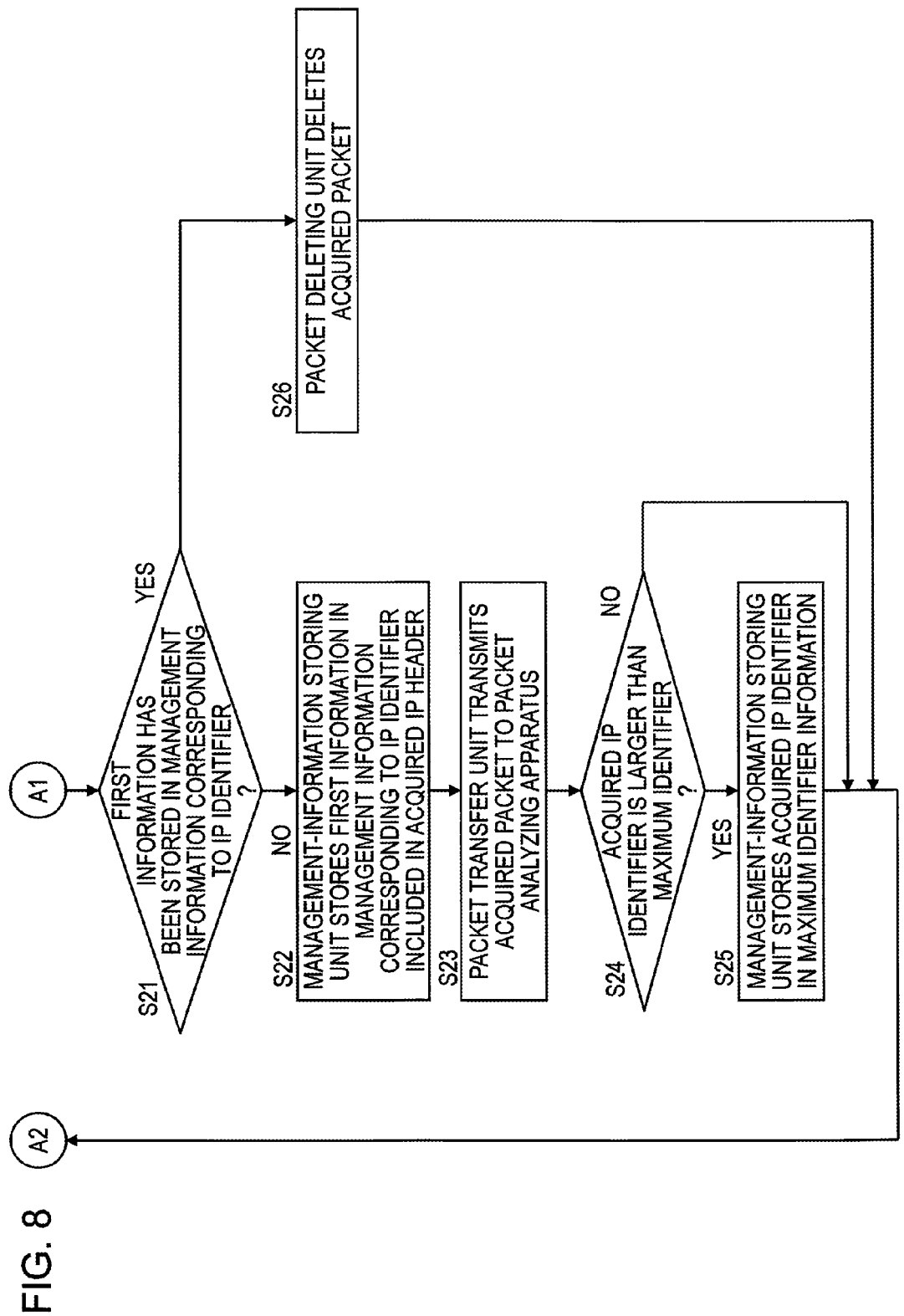
Figure 9:
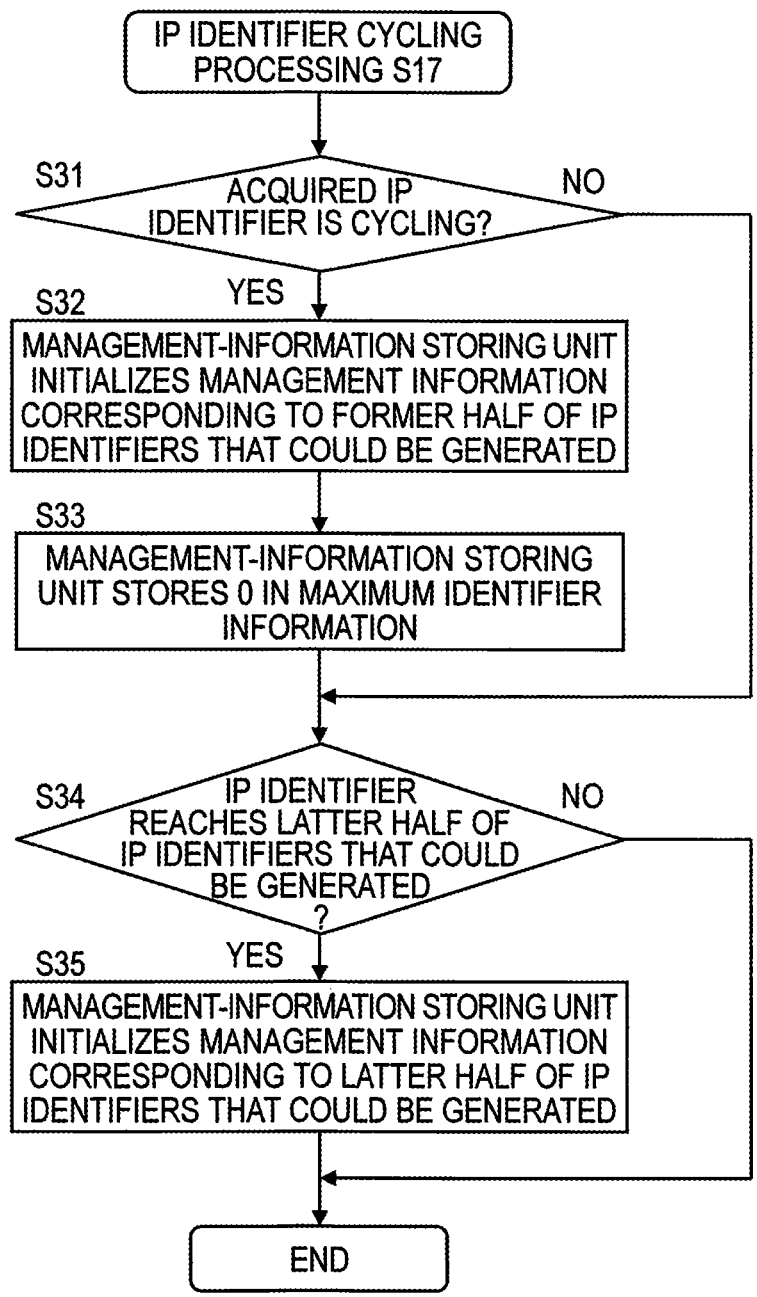

Details of the first embodiment are explained. FIGS. 7 to 9 are flowcharts for explaining details of the redundant packet detection processing in the first embodiment. FIGS. 10A to 12 are diagrams for explaining details of the redundant packet detection processing in the first embodiment. The details of the redundant packet detection processing in FIGS. 7 to 9 are explained with reference to FIGS. 10A to 12.

First, when the packet acquiring unit 311 of the redundant packet detecting apparatus 3 acquires a communication packet at a capture point (S11), the packet acquiring unit 311 acquires, for example, information for specifying a communication session in which the acquired communication packet is included (S12 and S13).

FIGS. 10A and 10B are diagrams depicting the configuration of a communication packet (an IP packet) in this embodiment. The IP packet includes an IP header including information such as a "transmission source IP" and a "transmission destination IP" and an IP payload. The communication packet in this embodiment includes an IP packet including a Transmission Control Protocol (TCP) header as depicted in FIG. 10A and an IP packet including a User Datagram Protocol (UDP) header as depicted in FIG. 10B. Specifically, the IP payload of the IP packet depicted in FIG. 10A includes a TCP header including information such as a "transmission source port" and a "transmission destination port" and a TCP payload. The IP payload of the IP packet depicted in FIG. 10B includes a UDP header including information such as a "transmission source port" and a "transmission destination port" and a UDP payload.

The packet acquiring unit 311 acquires the "transmission source IP", the "transmission destination IP", and a "protocol number (protocol information)" of the acquired communication packet referring to the IP header (S12). Further, the packet acquiring unit 311 acquires the "transmission source port" and the "transmission destination port" of the acquired communication packet referring to the TCP header (the UDP header) (S13). That is, the packet acquiring unit 311 acquires, from the IP header and the TCP header (the UDP header) of the acquired communication packet, information needed to specify a communication session in which the acquired communication packet is transmitted and received. Consequently, as explained below, the session-information storing unit 312 can uniquely specify a communication session in which the communication packet acquired by the packet acquiring unit 311 is communicated. Note that, in this embodiment, the packet acquiring unit 311 acquires a communication packet in which at least the IP header and the TCP header (the UDP header) are not encapsulated (encrypted).

Specifically, the packet acquiring unit 311 may specify, for example, according to formats of the IP header and the TCP header, a position where information desired to be acquired is set in the IP header and the TCP header of the acquired communication packet and perform acquisition of the information. In this case, for example, the packet acquiring unit 311 acquires the "transmission source IP" and the like included in the IP header referring to the format of the IP header. Subsequently, the packet acquiring unit 311 specifies a leading position of the IP payload (the TCP header or the UDP header) of the acquired communication packet on the basis of "header length" included in the IP header referring to the format of the IP header. The packet acquiring unit 311 acquires the "transmission source port" and the like included in the TCP header (the UDP header) referring to, for example, the format of the TCP header (the UDP header).

Note that the packet transfer unit 315 of the redundant packet detecting apparatus 3 may transmit, for example, the communication packet acquired by the packet acquiring unit 311 to the packet analyzing apparatus 5 in a state in which the IP header and the TCP header are added to the communication packet. Consequently, the packet analyzing apparatus 5 can perform an analysis concerning the communication packet communicated through the network. The TCP header includes a "data offset" indicating a leading position of the TCP payload. A data size of the UDP header is fixed length. Therefore, the packet analyzing apparatus 5 can specify a leading position of the TCP payload or the UDP payload by referring to the TCP header or the UDP header transmitted from the redundant packet detecting apparatus 3.

The session-information storing unit 312 of the redundant packet detecting apparatus 3 specifies, for example, on the basis of the information acquired in S12 and S13, a communication session in which the acquired communication packet is included (S14). Note that the protocol number may include a protocol number of the TCP or a protocol number of the UDP.

Subsequently, the session-information storing unit 312 checks, for example, whether the session information 331 concerning the specified communication session is stored in the information storage region 330 (S15). When the session information 331 is not stored (NO in S15), the session-information storing unit 312 stores, for example, on the basis of the information included in the acquired IP header, the session information 331 concerning the communication session including the acquired communication packet in the information storage region 330 (S16). The session-information storing unit 312 secures, for example, a storage region for storing the management information 332 concerning a new communication session and stores information concerning the secured storage region in the storage position information 333 (S17).

FIGS. 11A and 11B are diagrams depicting a specific example of the session information 331 and the storage position information 333. As depicted in FIG. 11A, the session information 331 includes, as items, for example, an "ID" allocated to each communication session, a "transmission source IP", which is an IP address of a transmission source terminal, a "transmission destination IP", which is an IP address of a transmission destination terminal, and a "protocol number" indicating a protocol of the communication session. The session information 331 further includes, as items, for example, a "transmission port", which is a port number of the transmission source terminal and a "transmission destination port", which is a port number of the transmission destination terminal. Communication sessions stored in the information storage region 330 as the session information 331 are uniquely decided according to the "transmission source IP", the "transmission destination IP", the "protocol number", the "transmission source port", and the "transmission destination port". Specifically, in the session information 331 depicted in FIG. 11A, 10.20.30.40 is set as the "transmission source IP", 10.20.30.50 is set as the "transmission destination IP", and 6 is set as the "protocol number". Further, in the session information 331 depicted in FIG. 11A, 2000 is set as the "transmission source port" and 20 is set as the "transmission destination port". Information is omitted concerning the other information depicted in FIG. 11A.

As depicted in FIG. 11B, the storage position information 333 may store, for example, in the storage region (the information storage region 330), a leading address where the management information 332 concerning the communication sessions is stored. Specifically, in an example depicted in FIG. 11B, the storage position information 333 stores P1, P2, and P3 respectively as "leading storage addresses" of communication sessions, "IDs" of which are 1, 2, and 3. Note that, for example, when file names of the management information 332 concerning the communication sessions are respectively determined, the storage position information 333 may store the "IDs" of the communication sessions and the file name of the management information 332 of each communication session in association with each other.

Referring back to FIG. 7, the management-information storing unit 313 of the redundant packet detecting apparatus 3 acquires, for example, the IP identifier included in the IP header of the acquired communication packet (S18). The management-information storing unit 313 performs, for example, IP identifier cycling processing (S19). The IP identifier cycling processing is explained below.

FIG. 12 is a diagram depicting a specific example of the management information 332 of a communication session in which the "ID" is 1 in FIG. 11A. As depicted in FIG. 12, the management information 332 is, for example, a bit string. Bit regions of the management information 332 are preferably, for example, storage regions in which the management information 332 corresponding to IP identifiers that could be generated (e.g., 0 to 65535) can be respectively stored.

In the bit string depicted in FIG. 12, 1 is stored in bit regions where communication packets including corresponding IP identifiers are received. 0 is stored in bit regions where communication packets including corresponding IP identifiers are not received. Therefore, in the management information 332 before the packet acquiring unit 311 starts acquisition of a communication packet, 0 may be stored in all the bit regions.

Specifically, an example of the management information 332 depicted in FIG. 12 corresponds to the storage position information 333 depicted in FIG. 11B. The management information 332 includes three bit strings, leading addresses of which are respectively P1, P2, and P3. In the example depicted in FIG. 12, in the bit string, the leading address of which is P1, 1 is stored in bit regions of a first bit, a third bit, a fifth bit, and a fifteenth bit from the top. That is, in the management information 332 depicted in FIG. 12, communication packets, the IP identifiers of which are 1, 3, 5, and 15, are already stored. Similarly, in the bit string, the leading address of which is P2, 1 is stored in bit regions of a third bit, a seventh bit, and a sixteenth bit from the top. In the bit string, the leading address of which is P3, 1 is stored in bit regions of a twelfth bit and a twenty-first bit from the top. Note that, in the management information 332 depicted in FIG. 12, 0 is stored in the bit regions where the communication packets including the corresponding IP identifiers are not received. 1 may be stored in the bit regions where the communication packets including the corresponding IP identifiers are included.

IP Identifier Cycling Processing (S19)

The IP identifier cycling processing is explained. FIG. 9 is a flowchart for explaining the IP identifier cycling processing.

A transmission source terminal of communication packets sometimes transmits, concerning the same communication session, communication packets exceeding the number of IP identifiers (e.g., 65536) that can be allocated. In this case, the transmission source terminal of communication packets causes IP identifiers to cycle, allocates the IP identifiers in order from the first IP identifier (e.g., 0) again, and transmits the communication packets (this is hereinafter referred to as cycling).

When the packet acquiring unit 311 acquires a communication packet to which the IP identifier caused to cycle is allocated, the management-information storing unit 313 needs to use, for storage of the management information 332 concerning the communication packet received anew, a bit region in which the first information is stored in the management information 332 in the past. Therefore, when detecting that the IP identifier has cycled, the management-information storing unit 313 executes the IP identifier cycling processing to thereby store, for example, the second information in the management information 332 having predetermined length from the top of the bit string of the management information 332. Details of the IP identifier cycling processing are explained below.

In FIG. 9, the management-information storing unit 313 acquires an IP identifier included in an IP header of a communication packet acquired by the packet acquiring unit 311 and checks whether the IP identifier is cycling (S31). Specifically, the management-information storing unit 313 subtracts the maximum identifier information 334 from the IP identifier of the communication packet received anew to perform calculation referring to, for example, the maximum identifier information 334. For example, when a calculated value is smaller than a predetermined threshold (e.g., −30000), the management-information storing unit 313 determines that the IP identifier is cycling. That is, for example, when the number of IP identifiers that could be generated is 65536, whereas the maximum identifier information 334 during cycling occurrence is a value close to 65536, the IP identifier of the communication packet acquired anew is a value close to 0. In this case, the calculated value is smaller than −30000. Therefore, in this case, the management-information storing unit 313 can detect that cycling of the IP identifier has occurred.

When the acquired IP identifier is cycling (YES in S31), the management-information storing unit 313 erases, for example, the management information 332 corresponding to a former half of the IP identifiers that could be generated (S32). Consequently, the management-information storing unit 313 can store new management information 332 immediately after the occurrence of the cycling of the IP identifier. Further, the management-information storing unit 313 stores, for example, 0 in the information storage region 330 as the maximum identifier information 334 (S33). When the IP identifier reaches a latter half of the IP identifiers that could be generated (YES in S34), the management-information storing unit 313 erases, for example, the management information 332 corresponding to the latter half of the IP identifiers that could be generated (S35).

That is, in an example depicted in FIG. 9, when detecting that the cycling of the IP identifier occurs, the management-information storing unit 313 stores 0 in the bit regions in the former half in the bit string of the management information 332. When detecting that the IP identifier reaches the latter half in the IP identifiers that could be generated, the management-information storing unit 313 stores 0 in the bit regions in the latter half in the bit string of the management information 332. Consequently, when the IP identifier caused to cycle is received, the management-information storing unit 313 can perform storage of new management information 332 after performing initialization of the bit regions. Therefore, for example, when the cycling of the IP identifier occurs, it is possible to prevent a situation in which it may be impossible to determine whether the management information 332 in which the first information is stored is stored in cycling of this time or stored in previous cycling. Even after the acquisition of the IP identifier caused to cycle, since the bit regions are initialized, the management-information storing unit 313 can perform the storage of the management information 332 by performing only update from 0 to 1 of the bit regions.

Note that, in the explanation of the example depicted in FIG. 9, the bit string of the management information 332 is divided into the former half and the latter half to erase the management information 332. However, the bit string may be divided into three or more to erase the management information 332 respectively in the divided bit strings. The management-information storing unit 313 may initialize, for example, the management information 332 corresponding to a predetermined number of (e.g., one thousand) IP Identifiers every time a communication packet including an IP identifier corresponding to a non-initialized bit region is acquired.

Referring back to FIG. 8, the packet determining unit 314 of the redundant packet detecting apparatus 3 checks, for example, whether the first information is stored in the management information 332 corresponding to the acquired IP identifier (S21). When the first information is not stored (NO in S21), the management-information storing unit 313 stores the first information in the management information 332 corresponding to the acquired IP identifier (S22). The packet transfer unit 315 of the redundant packet detecting apparatus 3 transmits, for example, the communication packet acquired by the packet acquiring unit 311 to the packet analyzing apparatus 5 (S23). That is, when the first information is not stored in the management information 332 corresponding to the acquired IP identifier, a communication packet corresponding to the IP identifier is not a redundant packet. Therefore, in this case, the packet transfer unit 315 transmits the acquired communication packet to the packet analyzing apparatus 5. Note that, for example, when the packet transfer unit 315 transmits a communication packet to the packet analyzing apparatus 5, the management-information storing unit 313 may store the acquired communication packet in the information storage region 330 or the like.

Further, when the acquired IP identifier is larger than the maximum identifier information 334 stored in the information storage region 330 (YES in S24), the management-information storing unit 313 stores, for example, the acquired IP identifier in the maximum identifier information 334 (S25). Consequently, in the IP identifier cycling processing, the management-information storing unit 313 can detect that the IP identifier has cycled.

On the other hand, when the first information is stored in the management information 332 corresponding to the acquired IP identifier (YES in S21), the packet deleting unit 316 of the redundant packet detecting apparatus 3 deletes the acquired communication packet (S26). Consequently, it is possible to prevent the same communication packet from being transmitted a plurality of times from the redundant packet detecting apparatus 3 to the packet analyzing apparatus 5.

Specific Example of a Redundancy Check Performed when a Communication Packet is Received A specific example of a redundancy check performed when a communication packet is received is explained with reference to FIGS. 11A to 12. In the following explanation, it is assumed that, in a communication packet acquired by the packet acquiring unit 311, the "transmission source IP" is 30.40.50.60, the "transmission destination IP" is 30.40.60.70, the "protocol number" is 17, and the "IP identifier" is 21. It is assumed that the "transmission source port" is 4000 and the "transmission destination port" is 3000.

First, the session-information storing unit 312 determines whether the combination of the information acquired by the packet acquiring unit 311 is present in the session information 331 depicted in FIG. 11A. In an example depicted in FIG. 11A, the session information 331 in which the "ID" is 3 coincides with the combination of the information. Therefore, the session-information acquiring unit 312 determines that the combination of the information concerning the acquired communication packet is included in the session information 331 depicted in FIG. 11A (YES in S15).

The packet determining unit 314 acquires P3, which is a leading storage address included in the session information 331 in which the "ID" is 3 in FIG. 11B, and accesses the management information 332 (the bit string) stored from the address P3. In an example depicted in FIG. 12, 1 is stored in a twenty-first bit from the top of the management information 332 stored from the address P3. Therefore, the packet determining unit 314 determines that the communication packet acquired by the packet acquiring unit 311 is a redundant packet (YES in S21). The packet deleting unit 316 deletes the communication packet acquired by the packet acquiring unit 311.

Note that, when the "IP identifier" is 20 in the example explained above, in the example depicted in FIG. 12, 0 is stored in a twentieth bit from the top of the management information 332 stored from the address P3. Therefore, the packet determining unit 314 determines that the communication packet acquired by the packet acquiring unit 311 is not a redundant packet (NO in S21). In this case, the management-information storing unit 313 stores 1 in a twentieth bit from the top of the management information 332 stored from the address P3 (S22). The packet transfer unit 315 transmits the communication packet acquired by the packet acquiring unit 311 to the packet analyzing apparatus 5 (S23).

Second Embodiment

Figure 13:
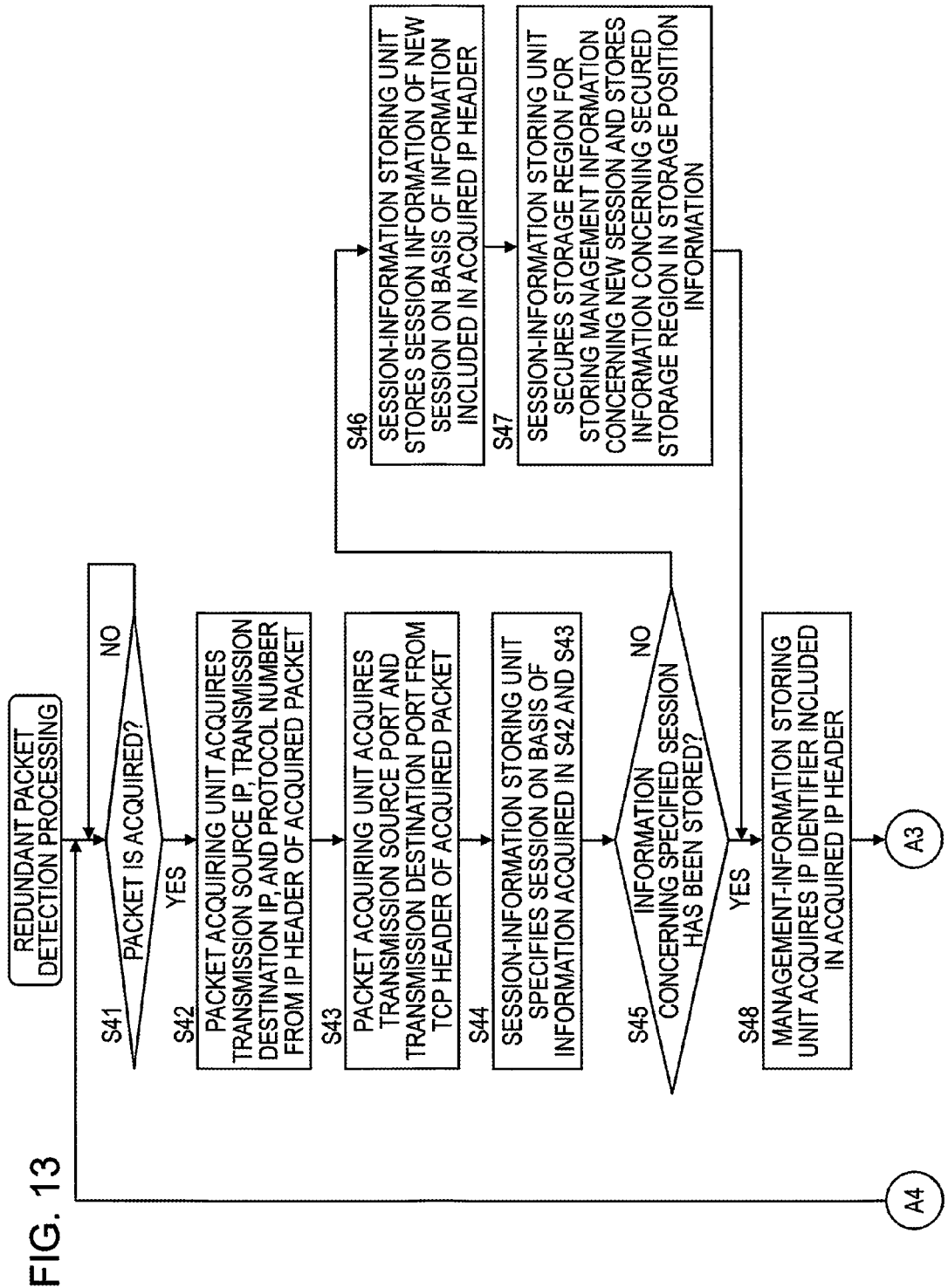
FIGS. 13 to 15 are flowcharts for explaining redundant packet detection processing in the second embodiment.
Figure 14:
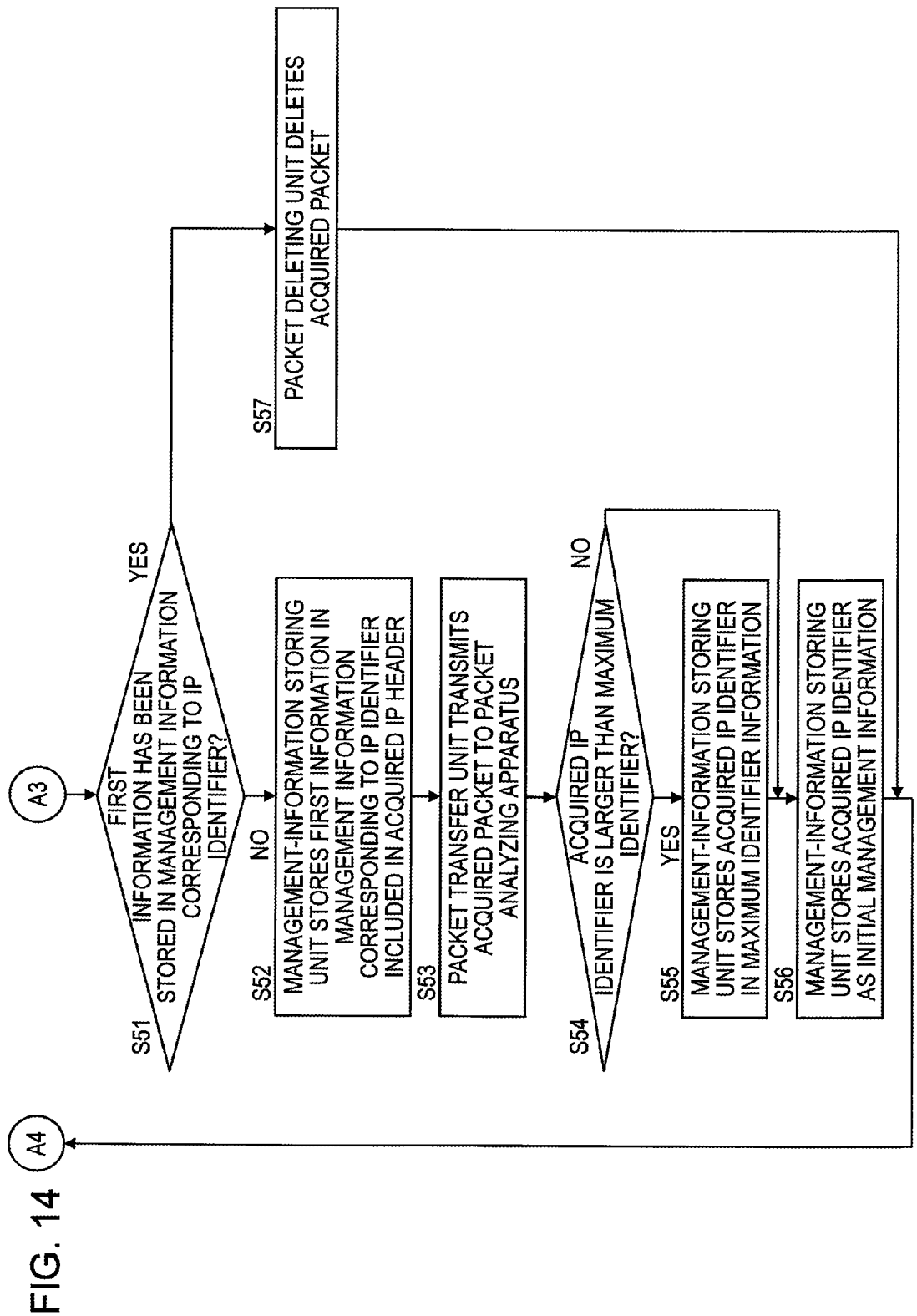
Figure 15:
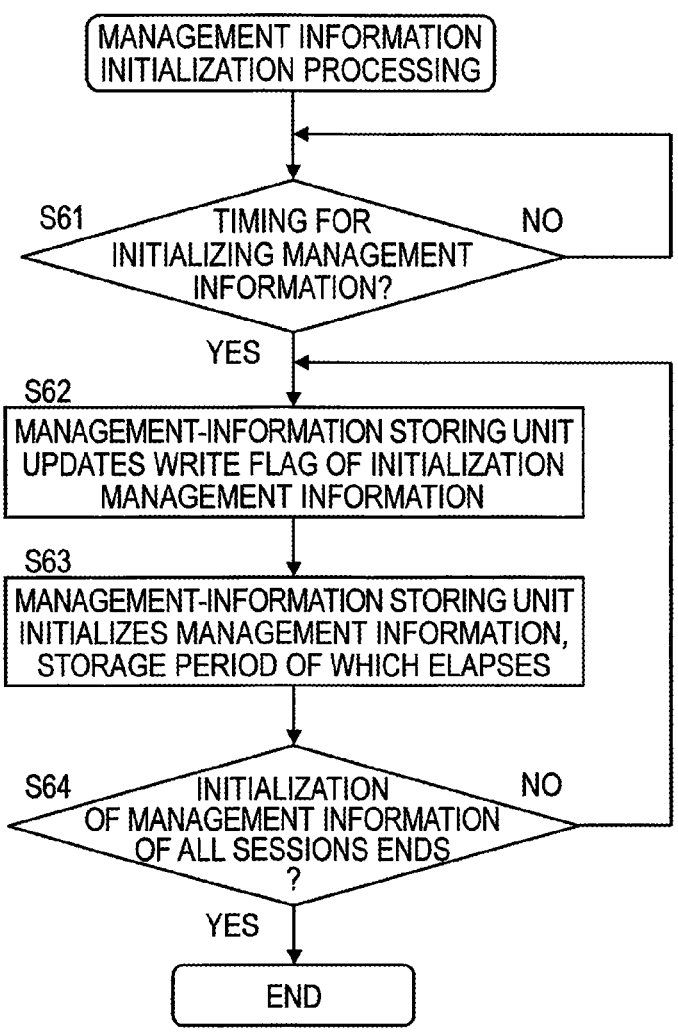

A second embodiment is explained. FIGS. 13 to 15 are flowcharts for explaining redundant packet detection processing in the second embodiment. FIGS. 16A to 19B are diagrams for explaining the redundant packet detection processing in the second embodiment. The redundant packet detection processing in FIGS. 13 to 15 are explained with reference to FIGS. 16A to 19B.

In the first embodiment, as explained with reference to FIG. 9, the management-information storing unit 313 initializes the management information 332 according to the IP identifier cycling processing. That is, when detecting that cycling of the IP identifier occurs, the management-information storing unit 313 in the first embodiment initializes a part of the bit string in the management information 332.

The management information 332 sometimes needs to be stored for a fixed time, for example, according to an analysis situation in the packet analyzing apparatus 5. In this case, in the first embodiment, when the cycling of the IP identifier occurs in a short time, the management information 332 is sometimes initialized before a period in which the management information 332 needs to be stored elapses. Therefore, in the second embodiment, update of the management information 332 is performed on the basis of the period in which the management information 332 needs to be stored. In the following explanation, details of redundant packet detection processing in the second embodiment are explained.

First, when the packet acquiring unit 311 acquires a communication packet at a capture point (S41), the packet acquiring unit 311 acquires, for example, information for specifying a communication session in which the acquired communication packet is included. Specifically, as in the first embodiment, the packet acquiring unit 311 acquires, for example, a "transmission source IP", a "transmission destination IP", and a "protocol number" from an IP header of the acquired communication packet (S42). Further, the packet acquiring unit 311 acquires, for example, as depicted in FIGS. 10A and 10B, a "transmission source port" and a "transmission destination port" from a TCP header of the acquired communication packet (S43).

Subsequently, the session-information storing unit 312 specifies, for example, on the basis of the information acquired in S42 and S43, a communication session in which the acquired communication packet is included (S44) and checks whether the session information 331 concerning the specified communication session has been stored in the information storage region 330 (S45). When the session information 331 has not been stored (NO in S45), the session-information storing unit 312 stores, for example, on the basis of the acquired information included in the IP header, the session information 331 concerning the communication session including the acquired communication packet in the information storage region 330 (S46). The session-information storing unit 312 secures, for example, a storage region for storing the management information 332 concerning a new communication session and stores information concerning the secured storage region in the storage position information 333 (S47).

The management-information storing unit 313 acquires, for example, an IP identifier included in the IP header of the acquired communication packet (S48). Note that, in the second embodiment, unlike the first embodiment, the IP identifier cycling processing is not performed.

Subsequently, as in the first embodiment, the packet determining unit 314 checks, for example, whether the first information has been stored in the management information 332 corresponding to the acquired IP identifier (S51). When the first information has not been stored (NO in S51), the management-information storing unit 313 stores the first information in the management information 332 corresponding to the acquired IP identifier (S52). The packet transfer unit 315 transmits, for example, the communication packet acquired by the packet acquiring unit 311 to the packet analyzing apparatus 5 (S53). Further, when the acquired IP identifier is larger than the maximum identifier information 334 stored in the information storage region 330 (YES in S54), the management-information storing unit 313 stores, for example, the acquired IP identifier in the maximum identifier information 334 (S55). In the second embodiment, the management-information storing unit 313 stores, for example, the acquired IP identifier in the information storage region 330 as the initialization management information 336 (S56). The initialization management information 336 is explained below.

On the other hand, when the first information has been stored in the management information 332 corresponding to the acquired IP identifier (YES in S51), the packet deleting unit 316 deletes the acquired communication packet (S56).

FIGS. 16A and 16B are diagrams depicting specific examples of the initialization management information 336. As depicted in FIG. 16A, the storage period information 335 includes, as items, for example, a "write flag" indicating a position where the management-information storing unit 313 stores an IP identifier, an "IP identifier" in which the IP identifier acquired by the management-information storing unit 313 is stored, and "update time" indicating time when the management-information storing unit 313 stores the IP identifier.

In the initialization management information 336 in the examples depicted in FIGS. 16A and 16B, the management-information storing unit 313 stores the IP identifier acquired by the management-information storing unit 313 in the position of the "IP identifier" indicated by the "write flag". In the example depicted in FIG. 16A, a state is depicted in which 7018 is stored in the position of the "IP identifier" indicated by the "write flag". In the example depicted in FIG. 16B, a state is depicted in which 7024 is stored in the position of the "IP identifier" indicated by the "write flag" from the state depicted in FIG. 16A. That is, in the state depicted in FIG. 16B, the "write flag" is not updated from the state depicted in FIG. 16A. Therefore, when a communication packet, an IP identifier of which is 7024, is received, the management-information storing unit 313 overwrites 7024 in the position of the "IP identifier" where the 7018 is stored. In the following explanation, management information initialization processing performed to update the "IP identifier" indicated by the "write flag" is explained.

Management Information Initialization Processing

FIG. 15 is a flowchart for explaining the management information initialization processing. First, at timing for initializing management information (YES in S61), the management-information storing unit 313 updates, for example, the "write flag" of the initialization management information 336 (S62). The timing for initializing the management information 332 is stored in, for example, the information storage region 330 as update cycle information 337. The update cycle information 337 may be, for example, 1 (ms) or the like. The management-information storing unit 313 updates the "write flag" of the initialization management information 336, for example, at the timing for initializing the management information referring to the update cycle information 337 (YES in S61 and S62). Note that a timer provided in the redundant packet detecting apparatus 3 may notify, at every cycle stored in the update cycle information 337, the management-information storing unit 313 of the timing for initializing the management information 332. A specific example of the update of the "write flag" is explained.

FIG. 17A depicts a state in which the management-information storing unit 313 updates the "write flag" from the state depicted in FIG. 16B. In the initialization management information 336 depicted in FIG. 17A, the management-information storing unit 313 performs the update such that 1, which is the "write flag", is stored in a row right under a row in which the "write flag" is currently stored. As depicted in FIG. 17B, the management-information storing unit 313 stores an IP identifier acquired new (in an example depicted in FIG. 17B, 7026) in the position of the "IP identifier" indicated by the updated "write flag". For example, when a new IP identifier is stored in the position of the "IP identifier" indicated by the updated "write flag", the management-information storing unit 313 may store, in the "update time", time when the IP identifier is stored.

That is, the management-information storing unit 313 can accumulate information concerning a maximum of an acquired IP identifier in every totaling period (in examples depicted in FIGS. 17A and 17B, 1 (ms)) stored in the update cycle information 337 by repeatedly storing the acquired IP identifier in the initialization management information 336 and updating the position of the "write flag" every time the totaling period elapses.

Referring back to FIG. 15, the management-information storing unit 313 initializes, for example, on the basis of the storage period information 335 and the initialization management information 336, the management information 332, a storage period of which elapses (S63). In the following explanation, a specific example of initialization of the management information 332 is explained.

FIGS. 18A and 18B are examples for explaining initialization of the management information 332 in S63 in FIG. 15. In the examples depicted in FIGS. 18A and 18B, IP identifiers that could be generated are 0 to 65535. Note that numbers in FIGS. 18A and 18B indicate IP identifiers corresponding to the management information 332 stored in respective bit regions. In the following explanation, a storage period of the management information 332 stored in the storage period information 335 is 2 (ms).

The management-information storing unit 313 acquires, for example, referring to the initialization management information 336 in the state depicted in FIG. 17A, information concerning an IP identifier in which the storage period of the management information 332 elapses. In the example depicted in FIG. 17A, totaling in a totaling period in which the "update time" is 13:25:14.006 is completed. Therefore, in the example depicted in FIG. 17A, an IP identifier in which the storage period stored in the storage period information 335 elapses is an IP identifier stored before a totaling period in which the "update time" is 13:25:14.004. In this case, the management-information storing unit 313 determines that a maximum of IP identifiers in which the management information 332 needs to be initialized is 4018 stored in association with the totaling period in which the "update time" is 13:25:14.004. Further, in the example depicted in FIG. 17A, a maximum of IP identifiers stored in the totaling period in which the "update time" is 13:25:14.006, which is an immediately preceding totaling period, is 7024. Therefore, in the example depicted in FIG. 17A, the management-information storing unit 313 determines that, for example, IP identifiers other than 4019 to 7024 need to be initialized.

Therefore, the management-information storing unit 313 updates the management information 332, for example, as in a bit string of the management information 332 depicted in FIG. 18B. That is, in the example depicted in FIG. 18B, the management-information storing unit 313 updates the top (an identifier 0) of a bit string to a bit region corresponding to the identifier 4018 and a bit region corresponding to the identifier 7025 to a last bit region in the management information 332 to 0 (a hatched portion in FIG. 18B). Consequently, the management-information storing unit 313 can initialize the management information 332, the storage period of which elapses.

Note that, as depicted in FIG. 19A, when information is stored in all regions for storing the initialization management information 336, cycling may be performed in the initialization management information 336. That is, the management-information storing unit 313 performs update such that, for example, the position of the "IP identifier" indicated by the "write flag" is the first row in the example depicted in FIG. 19B. The management-information storing unit 313 may store the acquired IP identifier by updating an IP identifier stored in the "IP identifier" in the first row.

Referring back to FIG. 15, the management-information storing unit 313 repeats, for example, for bit strings of the management information 332 concerning all communication sessions, the processing of S62 to S63 until the initialization of the management information 332 ends (S64).

In this way, according to the second embodiment, the management-information storing unit 313 stores a maximum of acquired IP identifiers acquired in every totaling period in the initialization management information 336. The management-information storing unit 313 initializes, referring to the initialization management information 336, the management information 332, the storage period of which stored in the storage period information 335 elapses. Consequently, the management-information storing unit 313 can prevent the management information 332 from being initialized before the storage period of the management information 332 stored in the storage period information 335 elapses.

According to the second embodiment, since the management information 332, the storage period of which stored in the storage period information 335 elapses, is initialized, there is no need to perform processing for determining whether initialization is performed and initialization processing every time the packet acquiring unit 311 acquires a communication packet. Therefore, it is possible to prevent an increase in a load on the CPU or the like.

Note that, in the examples depicted in FIGS. 16A and 16B and the like, the management-information storing unit 313 stores, in the initialization management information 336, the maximum of the IP identifiers acquired in each totaling period. However, the management-information storing unit 313 may store, in the initialization management information 336, a minimum of the IP identifiers acquired in each totaling period.

Third Embodiment

Figure 20:
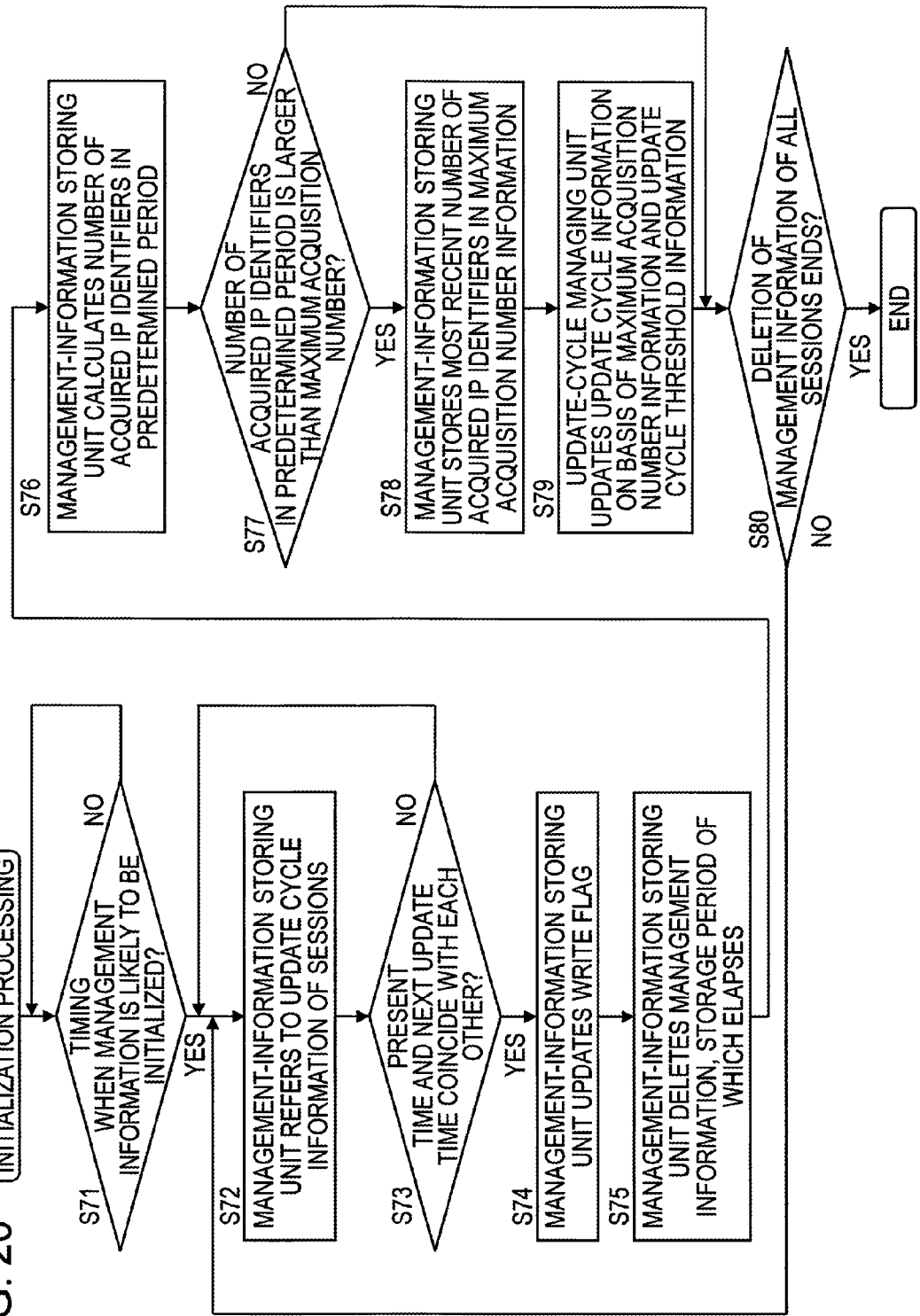
FIG. 20 is a flowchart for explaining redundant packet detection processing in the third embodiment.
Figure 23:
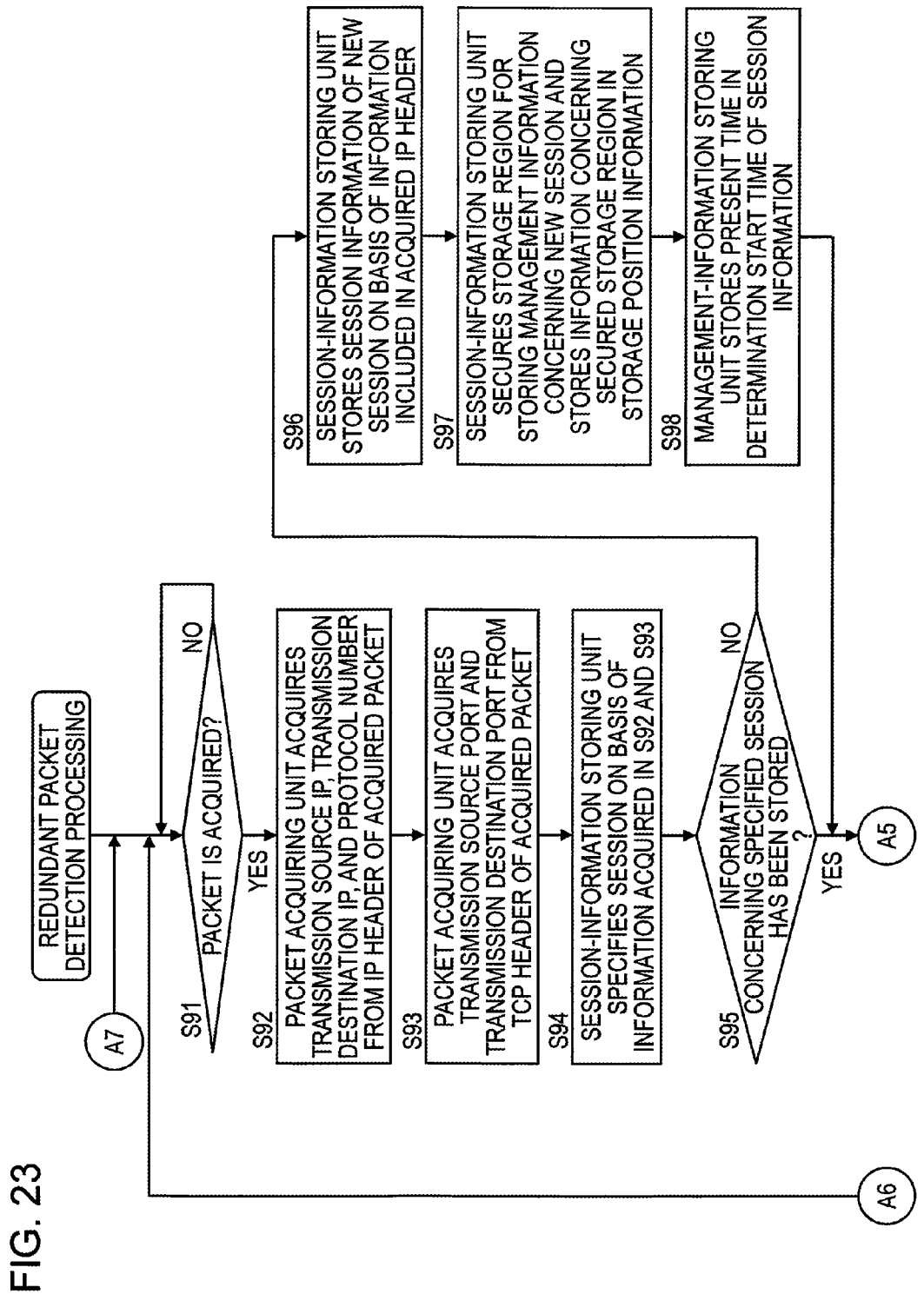
FIGS. 23 to 26 are flowcharts for explaining redundant packet detection processing in the fourth embodiment.
Figure 24:
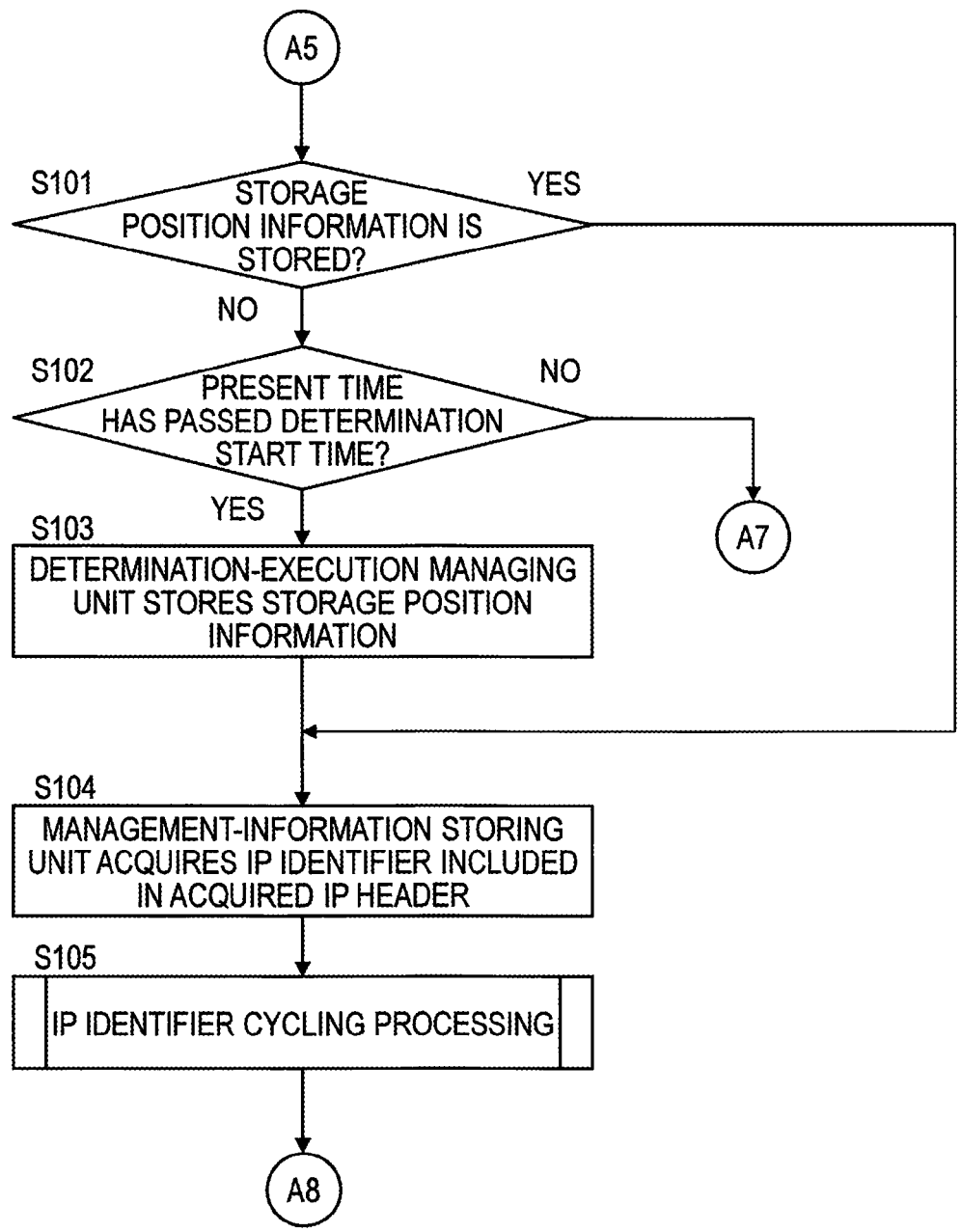
Figure 25:
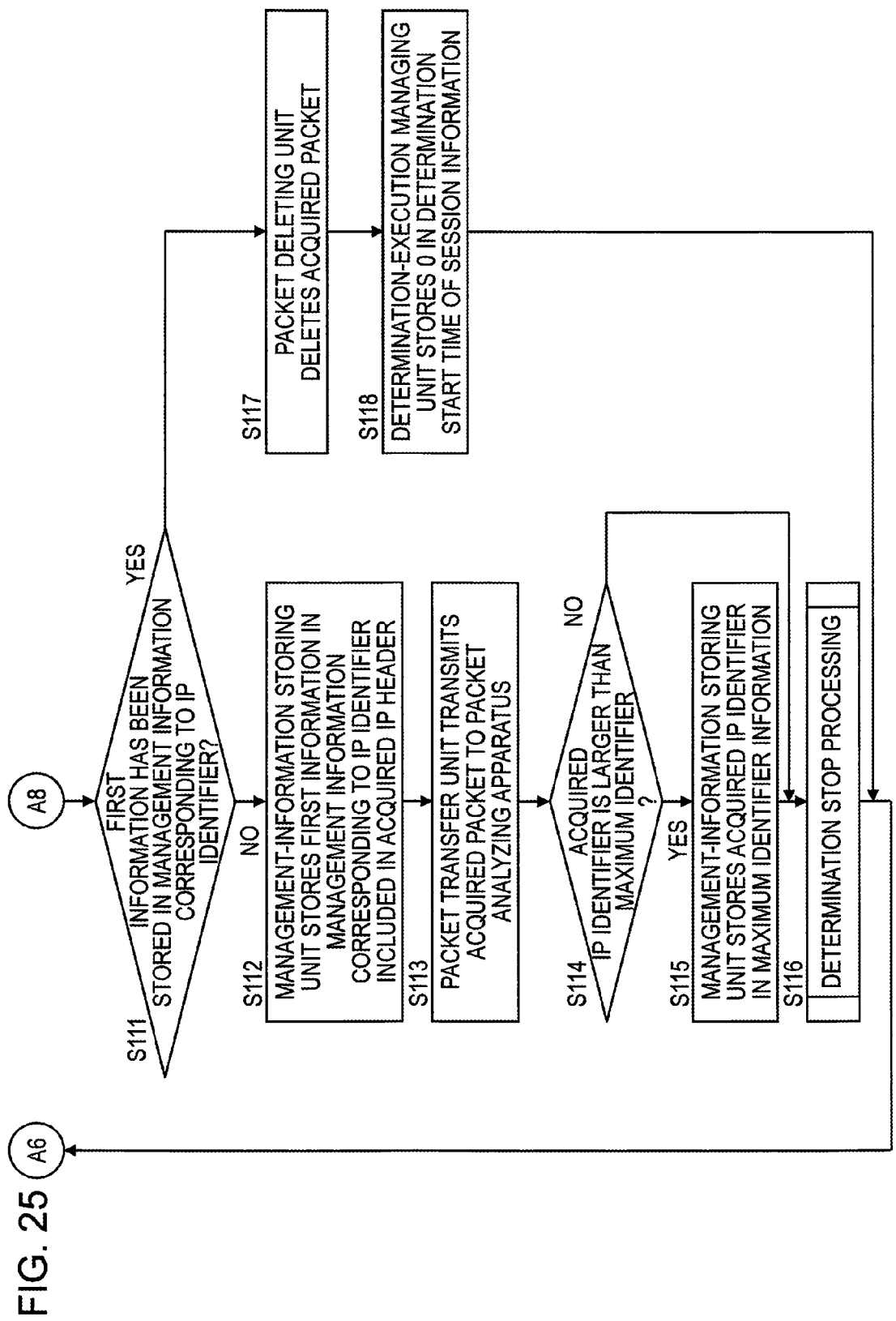

A third embodiment is explained. FIG. 20 is a flowchart for explaining redundant packet detection processing in the third embodiment. FIGS. 21A to 22D are diagrams for explaining the redundant packet detection processing in the third embodiment. The redundant packet detection processing depicted in FIG. 20 is explained with reference to FIGS. 21A to 22D.

In the third embodiment, unlike the second embodiment, a totaling period stored in the update cycle information 337 is updated according to a change in an amount of communication packets acquired by the packet acquiring unit 311. That is, when a frequency of communication packets acquired by the packet acquiring unit 311 is larger than a threshold set in advance, a totaling time is set short. When the frequency of communication packets acquired by the packet acquiring unit 311 is smaller than the threshold set in advance, the totaling time is set long.

First, at timing when management information is likely to be initialized (YES in S71), the management-information storing unit 313 refers to, for example, the update cycle information 337 of communication sessions (S72). The management-information storing unit 313 checks, for example, whether time (hereinafter also referred to as next update time) obtained by adding up latest update time in the initialization management information 336 and the totaling period stored in the update cycle information 337 coincides with the present time (S73). That is, in the third embodiment, the totaling period in the update cycle information 337 is sometimes different in each communication session. Therefore, the management-information storing unit 313 needs to refer to the update cycle information 337 at timing when the management information 332 is likely to be initialized. The timing when the management information 332 is likely to be initialized may be, for example, the greatest common divisor of totaling periods of the communication sessions.

When the present time and the next update time coincide with each other (YES in S73), for example, as in the second embodiment, the management-information storing unit 313 updates the "write flag" of the initialization management information 336 of a communication session in which the present time and the next update time coincide with each other (S74). Further, the management-information storing unit 313 initializes, for example, on the basis of the storage period information 335 and the initialization management information 336, the management information 332, the storage period of which elapses (S75).

Subsequently, the management-information storing unit 313 calculates, for example, the number of acquired IP identifiers in a predetermined period (S76). The predetermined period is, for example, 100 (ms) or the like and is preferably a period longer than periods stored in the storage-period information 335, the update cycle information 337, and the like. Consequently, for example, when the number of acquired communication packets greatly fluctuates in a short term, it is possible to suppress the influence of the fluctuation. When the calculated number of the acquired IP identifiers in the predetermined period is larger than the number of acquired IP identifiers stored in the maximum acquisition number information 338 (S77), the management-information storing unit 313 stores, for example, the calculated acquired number of IP identifiers in the predetermined period in the maximum acquisition number information 338 (S78). Further, the update-cycle managing unit 318 updates the update cycle information 337, for example, on the basis of the maximum acquisition number information 338 and the update cycle threshold information 339 (S79). The management-information storing unit 313 repeats the processing in S72 to S79, for example, until the initialization of the management information 332 concerning all the communication sessions ends (S80).

FIGS. 21A to 22D are diagrams depicting specific examples of the initialization management information 336, the update cycle information 337, the maximum acquisition number information 338, and the update cycle threshold information 339. In explanation referring to FIGS. 21A to 22D, it is assumed that the management-information storing unit 313 calculates the number of acquired IP identifiers with the predetermined period in S76 set to 20 (ms).

FIGS. 21A to 21D are examples depicting a state after the "write flag" of the initialization management information 336 is updated by the management-information storing unit 313 (after S74). In the examples depicted in FIGS. 21A to 21D, the management-information storing unit 313 stores 8614 in a maximum acquisition number of the maximum acquisition number information 338 as depicted in FIG. 21C. Therefore, as depicted in FIG. 21B, the update-cycle managing unit 318 sets 5 in the update cycle information 337 referring to the update cycle threshold information 339 depicted in FIG. 21D.

In the examples depicted in FIGS. 21A to 21D, the management-information storing unit 313 calculates the acquired number of IP identifiers in recent 20 (ms) referring to the initialization management information 336 depicted in FIG. 21A (S76). Specifically, in the examples depicted in FIGS. 21A to 21D, the management-information storing unit 313 calculates, for example, 8205, which is a difference between 10234, which is a maximum of IP identifiers in a totaling period in which the "update time" is 13:25:14.025, and 2029, which is a maximum of IP identifiers in a totaling period in which the "update time" is 13:25:14.005. In this case, since the calculated value is smaller than the maximum acquisition number (8614) stored in the maximum acquisition number information 338 (NO in S77), the management-information storing unit 313 does not update the maximum acquisition number information 338 and the like (S78 and S79). Note that, in the examples depicted in FIGS. 21A to 21D, the management-information storing unit 313 stores 13:25:14.030, which is the next update time, in the initialization management information 336 as depicted in FIG. 21A on the basis of 13:25:14.025, which is the present time, and 5, which is the totaling period stored in the update cycle information 337.

On the other hand, FIGS. 22A to 22D are examples depicting a state after storage of IP identifiers in the next totaling period ends from the state depicted in FIGS. 21A to 21D and the "write flag" is further updated by the management-information storing unit 313 (after S74).

In the examples depicted in FIGS. 22A to 22D, as in the case of FIGS. 21A to 21D, the management-information storing unit 313 calculates the number of acquired IP identifiers in recent 20 (ms) referring to the initialization management information 336 depicted in FIG. 22A (S76). Specifically, in the examples depicted in FIG. 22A, the management-information storing unit 313 calculates, for example, 22438, which is a difference between 27412, which is a maximum of IP identifiers in a totaling period in which the "update time" is 13:25:14.030, and 4974, which is a maximum of IP identifiers in a totaling period in which the "update time" is 13:25:14.010. Unlike the examples depicted in FIGS. 21A to 21D, the calculated value is larger than the maximum acquisition number stored in the maximum acquisition number information 338 (YES in S77). Therefore, the management-information storing unit 313 stores the calculated value the maximum acquisition number information 338 as depicted in FIG. 22C (S78). Further, the management-information storing unit 313 stores 1 as the update cycle information 337 as depicted in FIG. 22B referring to the update cycle threshold information 339 depicted in FIG. 22D. Note that, in the examples depicted in FIG. 22A, the management-information storing unit 313 stores 13:25:14.031, which is the next update time, in the initialization management information 336 on the basis of 13:25:14.030, which is the present time, and 1, which is the totaling period stored in the update cycle information 337.

In this way, according to the third embodiment, when the calculated number of acquired IP identifiers in the predetermined period is larger than a threshold (e.g., the threshold in the update cycle threshold information 339 stored in the information storage region 330), the management-information storing unit 313 sets a totaling period short. When the calculated number of acquired IP identifiers in the predetermined period is smaller than the threshold, the management-information storing unit 313 sets the totaling period long. Consequently, when an amount of communication packets acquired by the packet acquiring unit 311 is small, it is possible to reduce a frequency of initialization of the management information 332 by the management-information storing unit 313. Therefore, it is possible to reduce a processing load on the CPU or the like of the redundant packet detecting apparatus 3. When the amount of communication packets acquired by the packet acquiring unit 311 is large, it is possible to increase the frequency of initialization of the management information 332 by the management-information storing unit 313. Therefore, it is possible to increase accuracy of detection of cycling of IP identifiers.

Fourth Embodiment

A fourth embodiment is explained. FIGS. 23 to 26 are flowcharts for explaining redundant packet detection processing in the fourth embodiment. FIGS. 27A to 31C are diagrams for explaining the redundant packet detection processing in the fourth embodiment. The redundant packet detection processing in FIGS. 23 to 26 is explained with reference to FIGS. 27A to 31C.

In the fourth embodiment, as a result of performing a redundancy check (hereinafter also referred to as determination) in a determination period, the redundancy check is stopped for a communication session in which a redundant packet is not detected. In the fourth embodiment, in the communication session in which the redundancy check is stopped, the redundancy check is resumed after a determination stop period elapses. Note that, unlike the session information 331 in the first embodiment, the session information 331 in the fourth embodiment includes an item "determination start time". The item "determination start time" is explained below.

First, when the packet acquiring unit 311 acquires a communication packet at a capture point (S91), the packet acquiring unit 311 acquires, for example, information for specifying a communication session in which the acquired communication packet is included. Specifically, as in the first embodiment, the packet acquiring unit 311 acquires, for example, a "transmission source IP", a "transmission destination IP", and a "protocol number" from an IP header of the acquired communication packet (S92). Further, the packet acquiring unit 311 acquires, for example, as depicted in FIGS. 10A and 10B, a "transmission source port" and a "transmission destination port" from a TCP header of the acquired communication packet (S93).

Subsequently, the session-information storing unit 312 specifies, for example, on the basis of the information acquired in S92 and S93, a communication session in which the acquired communication packet is included (S94) and checks whether the session information 331 concerning the specified communication session is stored in the information storage region 330 (S95). When the session information 331 is not stored (NO in S95), the session-information storing unit 312 stores, for example, on the basis of the acquired information included in the IP header, the session information 331 concerning the communication session including the acquired communication packet in the information storage region 330 (S96). The session-information storing unit 312 secures, for example, a storage region for storing the management information 332 concerning a new communication session and stores information concerning the secured storage region in the storage position information 333 (S97). Further, unlike the first embodiment, the determination-execution managing unit 319 in the fourth embodiment stores the present time in the determination start time of the session information 331 (S98).

When the storage position information 333 concerning the communication session including the acquired communication packet is not stored and the present time has passed the determination start time (NO in S101 and YES in S102), the determination-execution managing unit 319 stores, for example, the storage position information 333 concerning the communication session including the acquired communication packet (S103). That is, although the session information 331 of the communication session is present (YES in S95 and S98), when the storage position information 333 is not stored (NO in S101), the determination-execution managing unit 319 determines that the communication session is a communication session in which the redundancy check is stopped. Further, when the present time has passed the determination start time (YES S102), the determination-execution managing unit 319 resumes the redundancy check of the communication session in which the redundancy check is stopped. A specific example of the stop and the resumption of the redundancy check of the communication session is explained below.

On the other hand, when the present time has not passed the determination start time (NO in S102), time when the redundancy check of the communication session is resumed has not come yet. Therefore, the determination-execution managing unit 319 ends the redundant packet detection processing concerning the acquired communication packet. That is, in this case, the determination-execution managing unit 319 does not resume the redundancy check of the communication session in which the redundancy check is stopped.

When the storage position information 333 concerning the communication session including the acquired communication packet is stored (YES in S101), the management-information storing unit 313 acquires, for example, an IP identifier included in an IP header of the acquired communication packet (S104) and performs the IP identifier cycling processing (S105). Similarly, when the determination-execution managing unit 319 stores the storage-position information 333 (S103), the management-information storing unit 313 acquires, for example, an IP identifier included in an IP header of the acquired communication packet (S104) and performs the IP identifier cycling processing (S105).

Subsequently, as in the first embodiment, the packet determining unit 314 checks, for example, whether the first information is stored in the management information 332 corresponding to the acquired IP identifier (S111). When the first information is not stored (NO in S111), the management-information storing unit 313 stores the first information in the management information 332 corresponding to the acquired IP identifier (S112).

The packet transfer unit 315 transmits the communication packet acquired by the packet acquiring unit 311 to the packet analyzing apparatus 5 (S113). Further, when the acquired IP identifier is larger than the maximum identifier information 334 stored in the information storage region 330 (YES in S114), the management-information storing unit 313 stores, for example, the acquired IP identifier in the maximum identifier information 334 (S115). Further, in the fourth embodiment, the determination-execution managing unit 319 performs determination stop processing for stopping the redundancy check of a communication session including the acquired communication packet (S116). The determination stop processing is explained below.

On the other hand, when the first information is stored in the management information 332 corresponding to the acquired IP identifier (YES in S111), the packet deleting unit 316 deletes the acquired communication packet (S117). The determination-execution managing unit 319 sets, for example, 0 in the determination start time of the session information 331 in the communication session including the acquired communication packet (S118).

Determination Stop Processing (S116)

Figure 26:
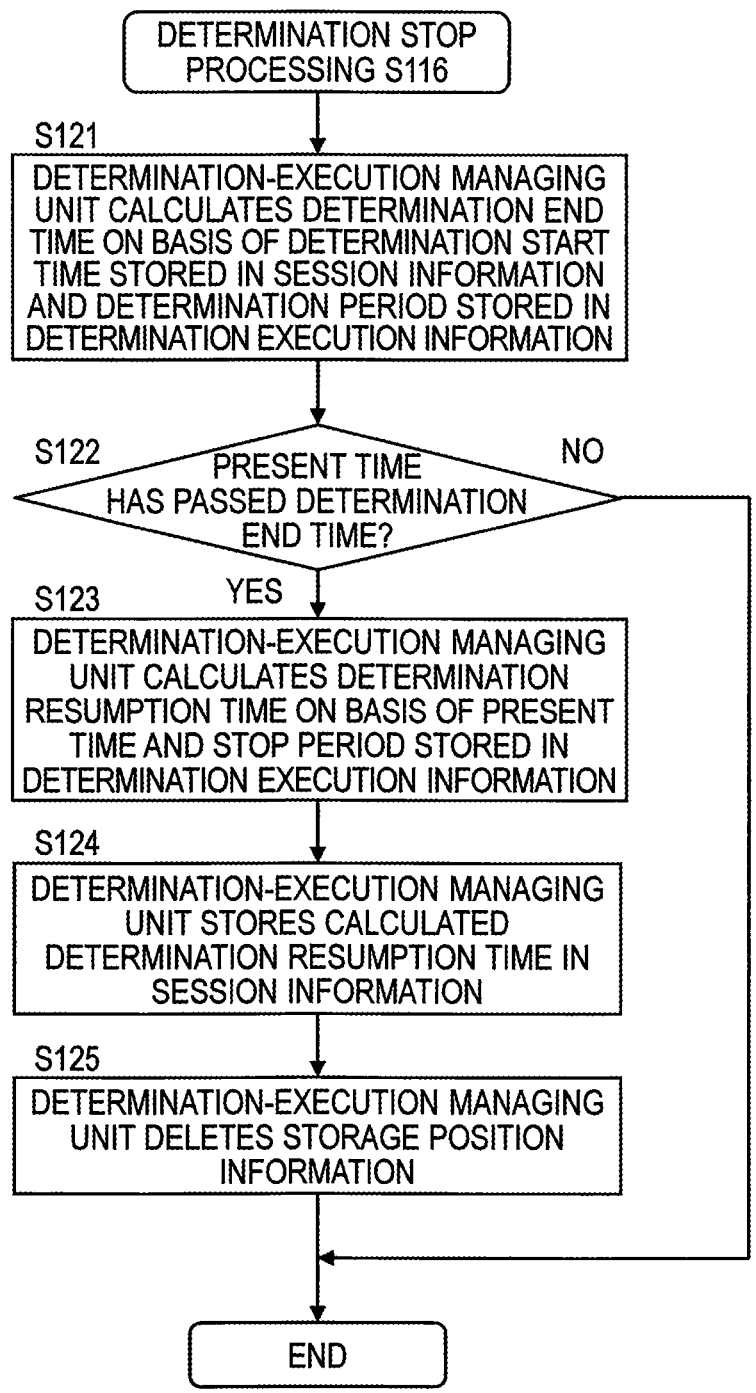

The determination stop processing for determining whether the redundancy check is stopped for the communication session including the acquired communication packet is explained. FIG. 26 is a flowchart for explaining the determination stop processing.

First, the determination-execution managing unit 319 calculates determination end time, for example, on the basis of the determination start time stored in the session information 331 of the communication session including the acquired communication packet and the determination period stored in the determination execution information 340 (S121).

FIGS. 27A to 27C are diagrams depicting specific examples of the session information 331, the storage position information 333, and the determination execution information 340 in the fourth embodiment. In S121, the determination-execution managing unit 319 calculates the determination end time by adding the "determination start time" to the "determination period" further referring to the "determination period" of the determination execution information 340. Specifically, in the session information 331 in which the "ID" is 1 in FIG. 27A, the "determination start time" is 13:15:12.000 and the "determination period" of the determination execution information 340 is "10 (s)". Therefore, the determination end time is 13:15:22.000.

Referring back to FIG. 26, when the present time has passed the determination end time (YES in S122), the determination-execution managing unit 319 calculates determination resumption time, for example, on the basis of the present time and the determination stop period stored in the determination execution information 340 (S123). The determination-execution managing unit 319 stores the calculated determination resumption time in the determination start time of the session information 331 (S124). That is, in response to the fact that the present time has passed the determination end time, the determination-execution managing unit 319 stops the redundancy check of the communication session. Therefore, the determination-execution managing unit 319 calculates time when the determination is resumed in the communication session in which the determination is stopped and stores the time in the session information 331.

Further, the determination-execution managing unit 319 deletes, for example, the storage position information 333 for stopping the determination. Consequently, the management-information storing unit 313 may be unable to refer to the management information 332 when a communication packet is received. Therefore, the management-information storing unit 313 stops the determination for which the storage position information 333 is deleted.

A specific example of the stop and the resumption of the redundancy check in the fourth embodiment is explained below.

In the examples depicted in FIGS. 27A to 27C, as depicted in FIG. 27B, the storage position information 333 of communication sessions in which the "ID" is 1 and 2 is stored. Therefore, when the packet acquiring unit 311 acquires a communication packet in which the "ID" of a communication session is 1 (YES in S91), since the session information 331 and the storage position information 333 concerning the acquired communication packet are stored (YES in S95 and YES in S101), the packet determining unit 314 performs the redundancy check (S111).

For example, when the communication packet acquired by the packet acquiring unit 311 is not a redundant packet (NO in S111), the determination-execution managing unit 319 adds up 13:15:12.000 stored as the "determination start time" and 10 (s) stored as the "determination period". Consequently, the determination-execution managing unit 319 calculates 13:15:22.000 as the determination end time (S121). The present time 13:15:25.000 has passed the determination end time 13:15:22.000 (YES in S122). Therefore, as depicted in FIG. 28A, the determination-execution managing unit 319 adds up the present time and 10 (s) stored as the "determination stop period" to thereby calculate 13:15:35.000 as the determination resumption time and stores 13:15:35.000 in the session information 331 (S123 and S124). As depicted in FIG. 28B, the determination-execution managing unit 319 deletes the storage position information 333 in which the "ID" of the communication session is 1 (S125). Consequently, the determination-execution managing unit 319 can stop the redundancy check of the communication session including the acquired communication packet.

Subsequently, when a communication packet included in the communication session in which the "ID" is 1, for which the packet acquiring unit 311 stops the redundancy check, is acquired, the determination-execution managing unit 319 checks whether the present time has passed the determination start time (S102). As depicted in FIG. 29A, for example, when the present time is 13:15:31.000, since the present time has not passed the "determination start time", the determination-execution managing unit 319 ends the redundancy check of the acquired communication packet (NO in S102). That is, in the examples depicted in FIGS. 29A to 29C, the determination-execution managing unit 319 does not perform the redundancy check of the acquired communication packet.

On the other hand, as depicted in FIG. 30A, for example, when the present time is 13:15:37.000, the present time has passed the "determination start time". Therefore, the determination-execution managing unit 319 starts the redundancy check of the acquired communication packet (YES in S102). As depicted in FIG. 30B, the determination-execution managing unit 319 stores the storage position information 333 of the communication session in which the "ID" is 1, for which the determination is stopped (S103). Consequently, the determination-execution managing unit 319 can resume the redundancy check of the communication session for which the determination is stopped.

When the acquired communication packet is a redundant packet as a result of the redundancy check by the packet determining unit 314 (YES in S111), the determination-execution managing unit 319 stores 0 in the determination start time of the session information 331 concerning the acquired communication packet (S118). That is, the determination-execution managing unit 319 sets the determination end time calculated in S121 of the determination end time to indicate time before the present time. The determination-execution managing unit 319 prevents S123 to S125, which are processing for stopping the redundancy check, from being executed for the communication session in which the redundant packet is generated. Consequently, the determination-execution managing unit 319 can execute the redundancy check for the communication packet included in the communication session in which the redundancy packet is generated.

In this way, according to the fourth embodiment, the redundancy check is stopped for the communication packet included in the communication session in which the redundant packet is not detected as a result of the redundancy check during the determination period. In the fourth embodiment, after the determination stop period elapses, the redundancy check is resumed for the communication packet included in the communication session for which the redundancy check is stopped. Consequently, the determination-execution managing unit 319 can perform the redundancy check while repeating the stop and the resumption for the communication packet included in the communication session for which it can be determined that the redundancy check is not needed. Therefore, it is possible to reduce a processing load on the CPU or the like of the redundant packet detecting apparatus 3.

According to the fourth embodiment, the redundancy check is performed for a communication packet included in a communication session in which a redundant packet was generated in the past. Consequently, it is possible to focus on performing the redundancy check for a communication packet included in a communication session in which the redundancy packet is highly likely to be generated again.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a packet processing program for causing a computer to execute a process comprising:
   specifying, according to acquisition of an IP packet, on the basis of information for specifying a communication session included in a header of the acquired IP packet, a communication session in which the acquired IP packet is transmitted and received;
   referring to management information corresponding to an IP packet identifier of each IP packet transmitted and received according to the specified communication session, the management information, for each IP packet identifiers included in headers of IP packets, being stored in a plurality of storage regions in a storage; and
   discarding the acquired IP packet when first information is stored in the storage as the management information corresponding to an IP packet identifier of the acquired IP packet and, when second information is stored in the storage as the management information corresponding to the IP packet identifier of the acquired IP packet, storing the management information corresponding to the IP packet identifier of the acquired IP packet in the storage and outputting the acquired IP packet.

2. The non-transitory computer-readable storage medium according to claim 1, wherein information of 1 bit is able to be stored in each of the storage regions.

3. The non-transitory computer-readable storage medium according to claim 1, wherein
   the IP packet identifiers are allocated in order of transmission of the IP packets, and
   the packet processing program further causes the computer to execute a process comprising:
   first storing, when the IP packet identifier of the acquired IP packet cycles, the second information in the management information corresponding a communication session corresponding to the cycling IP packet identifier and corresponding to a predetermined number of IP packet identifiers from a head of management information in the storage; and
   second storing, when the IP packet identifier of the acquired IP packet is an IP packet identifier corresponding to the management information in which the first information may be stored, the second information in the management information corresponding to the predetermined number of IP packet identifiers continuous to the IP packet identifiers corresponding to the management information in which the second information has been stored in the first storing.

4. The non-transitory computer-readable storage medium according to claim 1, wherein the packet processing program further causes the computer to execute a process comprising third storing the second information in the management information of which a storage period elapses after the first information is stored.

5. The non-transitory computer-readable storage medium according to claim 4, wherein, the third storing includes:
   storing the IP packet identifiers of the IP packet for which the first information is stored in each of continuous totaling periods, and
   storing the second information in the management information corresponding to the totaling period in which a period from storing the first information exceeds the storage period.

6. The non-transitory computer-readable storage medium according to claim 5, wherein the third storing includes reducing the totaling period when an acquisition frequency of the IP packet is greater than a predetermined threshold, and extending the totaling period when the acquisition frequency of the IP packet is less than the predetermined threshold.

7. The non-transitory computer-readable storage medium according to claim 1, wherein the referring includes, when the discarding of an IP packet included first communication session does not occur for a first predetermined period, stopping the referring to the management information corresponding to the first communication session.

8. The non-transitory computer-readable storage medium according to claim 7, wherein the referring includes resuming the referring to the management information corresponding to the first communication session when a second predetermined period elapses after stopping the referring to the management information corresponding to the first communication session.

9. The non-transitory computer-readable storage medium according to claim 7, wherein the referring includes, when the discarding of the IP packet included the first communication session does not occur for the first predetermined period, erasing information to refer the management information corresponding to the first communication session.

10. A redundant packet detecting apparatus comprising:
    a storage configured to store management information corresponding to IP packet identifiers included in headers of IP packets; and
    a processor configured to specify, according to acquisition of an IP packet, on the basis of information for specifying a communication session included in a header of the acquired IP packet, a communication session in which the acquired IP packet is transmitted and received, refer to management information corresponding to an IP packet identifier of each IP packet transmitted and received according to the specified communication session, the management information, for each IP packet identifiers included in headers of IP packets, being stored in a plurality of storage regions in a storage, and discard the acquired IP packet when first information is stored in the storage as the management information corresponding to an IP packet identifier of the acquired IP packet and, when second information is stored in the storage as the management information corresponding to the IP packet identifier of the acquired IP packet, store the management information corresponding to the IP packet identifier of the acquired IP packet in the storing unit and output the acquired IP packet.

11. A packet processing method comprising:
    specifying, by a processor, according to acquisition of an IP packet, on the basis of information for specifying a communication session included in a header of the acquired IP packet, a communication session in which the acquired IP packet is transmitted and received;

referring, by a processor, to management information corresponding to an IP packet identifier of each IP packet transmitted and received according to the specified communication session, the management information, for each IP packet identifiers included in headers of IP packets, being stored in a plurality of storage regions in a storage; and discarding, by a processor, the acquired IP packet when first information is stored in the storage as the management information corresponding to an IP packet identifier of the acquired IP packet and, when second information is stored in the storage as the management information corresponding to the IP packet identifier of the acquired IP packet, storing, by a processor, the management information corresponding to the IP packet identifier of the acquired IP packet in the storage and outputting, by a processor, the acquired IP packet.

* * * * *